US012123192B2

(12) United States Patent
Silva

(10) Patent No.: US 12,123,192 B2
(45) Date of Patent: Oct. 22, 2024

(54) CONCRETE REINFORCEMENT ASSEMBLY

(71) Applicant: RIOFLEX IP PTY LTD, Bundall (AU)

(72) Inventor: John Silva, Mount Gambier (AU)

(73) Assignee: RIOFLEX IP PTY LTD (AU)

( * ) Notice: Subject to any disclaimer, the term of this patent is extended or adjusted under 35 U.S.C. 154(b) by 805 days.

(21) Appl. No.: 17/257,950

(22) PCT Filed: Jul. 26, 2019

(86) PCT No.: PCT/AU2019/050790
§ 371 (c)(1),
(2) Date: Jan. 5, 2021

(87) PCT Pub. No.: WO2020/023999
PCT Pub. Date: Feb. 6, 2020

(65) Prior Publication Data

US 2021/0270035 A1 Sep. 2, 2021

(30) Foreign Application Priority Data

Aug. 1, 2018 (AU) ................................ 2018902801

(51) Int. Cl.
*E04C 5/02* (2006.01)
*B28B 23/04* (2006.01)
(Continued)

(52) U.S. Cl.
CPC .............. *E04C 5/02* (2013.01); *B28B 23/043* (2013.01); *E04B 1/98* (2013.01); *E04C 5/20* (2013.01); *E04G 11/00* (2013.01); *E04G 21/142* (2013.01)

(58) Field of Classification Search
CPC .......... B21F 27/12; B28B 23/043; E04B 1/98; E04B 5/32; E04C 3/26; E04C 5/02;
(Continued)

(56) References Cited

U.S. PATENT DOCUMENTS 3,098,275 A * 7/1963 Schweitzer ........... F16G 11/048 403/365
3,399,434 A * 9/1968 Kelly ........................ F16B 7/22 425/173
(Continued)

FOREIGN PATENT DOCUMENTS

| | | |
|---|---|---|
| CN | 107419848 | 12/2017 |
| WO | 1988/007613 | 10/1988 |

OTHER PUBLICATIONS

Machine Translation of WO8807613A1 (Year: 2024).*

*Primary Examiner* — James M Ference
(74) *Attorney, Agent, or Firm* — Sand, Sebolt & Wernow Co., LPA

(57) ABSTRACT

There is proposed a reinforced concrete structure comprising a reinforcement assembly embedded therein, the reinforcement assembly including first and second lengths of chain, wherein the first and second lengths of chain being pretensionable prior to forming the concrete structure. The reinforcement assembly includes pretensionable member/s and/or resiliently deformable member/s intermediate of at least one tetherable end of the lengths of chain and a mounting block or link member.

18 Claims, 18 Drawing Sheets

(51) Int. Cl.

| | |
|---|---|
| ***E04B 1/98*** | (2006.01) |
| ***E04C 5/20*** | (2006.01) |
| ***E04G 11/00*** | (2006.01) |
| ***E04G 21/14*** | (2006.01) |

(58) Field of Classification Search

CPC .......... E04C 5/06; E04C 5/0631; E04C 5/064; E04C 5/08; E04C 5/12; E04C 5/20; E04G 11/00; E04G 13/00; E04G 21/12; E04G 21/142

USPC ........................................................ 52/223.1

See application file for complete search history.

(56) References Cited

U.S. PATENT DOCUMENTS

| | | | | | |
|---|---|---|---|---|---|
| 3,399,437 | A * | 9/1968 | Kelly | E04G 21/121 | 425/111 |
| 3,466,822 | A * | 9/1969 | Piccard | E04C 5/08 | 52/223.14 |
| 3,475,529 | A * | 10/1969 | Lacy | B28B 23/028 | 52/223.6 |
| 3,647,308 | A * | 3/1972 | Yost | B28B 7/186 | 425/432 |
| 3,762,027 | A * | 10/1973 | Burtelson | E04G 21/12 | 403/374.1 |
| 3,892,826 | A * | 7/1975 | Yost | B28B 13/02 | 264/308 |
| 3,910,546 | A * | 10/1975 | Connors | E04G 17/0721 | 52/223.13 |
| 3,937,607 | A * | 2/1976 | Rodormer | B28B 23/043 | 52/223.13 |
| 3,965,542 | A * | 6/1976 | Gregory | E04G 17/0721 | 52/223.13 |
| 3,999,913 | A * | 12/1976 | Branitzky | B28B 23/06 | 249/126 |
| 4,040,775 | A * | 8/1977 | Nordbak | B28B 23/043 | 425/111 |
| 4,115,049 | A * | 9/1978 | Grubb | B28B 23/04 | 425/111 |
| 4,799,307 | A * | 1/1989 | Reigstad | E04C 5/122 | 52/223.13 |
| 5,316,461 | A * | 5/1994 | Silvestri | B28B 13/067 | 425/436 R |
| 6,443,666 | B1 * | 9/2002 | Smith | E02B 3/102 | 52/223.6 |
| 6,584,750 | B1 * | 7/2003 | Hanna | E04B 1/04 | 52/745.1 |
| 7,748,972 | B2 * | 7/2010 | Pellicer | A23L 3/3409 | 425/117 |
| 7,814,724 | B2 * | 10/2010 | Zoli, III | E04B 7/14 | 52/223.1 |
| 9,458,576 | B2 * | 10/2016 | French | E01C 5/10 | |
| 2002/0059768 | A1 * | 5/2002 | Blount | B28B 23/024 | 52/600 |
| 2002/0067960 | A1 * | 6/2002 | Smith | E02B 3/102 | 405/286 |
| 2007/0125017 | A1 * | 6/2007 | Blount | E04F 13/0835 | 52/223.1 |
| 2017/0191227 | A1 * | 7/2017 | Sylvester | E01C 5/20 | |
| 2021/0270035 | A1 * | 9/2021 | Silva | B28B 23/043 | |

* cited by examiner

CONCRETE REINFORCEMENT ASSEMBLY

FIELD OF THE INVENTION

The present invention relates to a reinforcement assembly for a concrete structure and in one embodiment relates to an earthquake resistant and/or impact resistant reinforced concrete structure.

The present invention relates to both precast concrete structures that are produced offsite and then transport and lifted into place onsite, as well as concrete structures that are poured into site-specific formwork and allowed to cure onsite. Although the invention will be described with particular reference to concrete panels it should be appreciated that the concrete structure is not limited to this configuration and any shape or size of structure could be constructed using the reinforcement assembly of the present invention, including but not limited to bridges, floor structures, building structures, slabs, arches, roads, retaining walls and reinforcement for land surfaces.

BACKGROUND OF THE INVENTION

Conventional reinforcement of concrete structure such as slabs or precast panels is undertaken using reinforcement bars (rebars) or mesh that are supported on spacers or chairs prior to pouring of the concrete mixture.

The steel reinforcement bars, fibres or mesh therefore help to strengthen the otherwise brittle concrete material. Prestressed steel cable and rods can be used for beams, floors and bridges, which have longer spans.

Typically, formwork is used to demarcate the extent of the concrete structure to be produced. Alternatively, the concrete is poured into a reusable or single use mould. The formwork or mould acts as a wall that supports the concrete until it has sufficiently set. For instance, in the situation of a slab being laid, the ground surface is levelled and formwork is setup along the edges of the proposed slab to thereby form a box or enclosure. The formwork is secured in place by pegs that are driven into the ground. Reinforcement mesh is then positioned within the box on spacers or chairs and the concrete mixture is poured into the box to encase the reinforcement mesh therein.

It is however common for the spacers or chairs to be dislodged during the pouring process or when workers are walking over the mesh. Accordingly, the reinforcement mesh may be knocked out of position and therefore not be positioned at the optimal location within the concrete structure once cured. This lack of consistency can result in areas of weakness within the concrete structure.

Furthermore, where plumbing needs to pass through the slab the reinforcement mesh needs to be cut, which may weaken the overall structure.

One system that has been proposed to overcome the problem of inconsistent positioning of the reinforcement is disclosed in U.S. Pat. No. 6,443,666 to Smith wherein a reinforced concrete panel is formed by embedding a stretched steel chain link mesh within the concrete. The link mesh however still needs to be cut if pipes are required to be run through the concrete slab which significantly affects the structure, since each individual wire strand of the chain link mesh is held under tension by adjacent intertwined wire strands.

Another system is disclosed in International Application PCT/CH88/00069 in the name of NILL, wherein chains are used as a reinforcement in a concrete structure. The chains are however held in place by attaching them to conventional rod-shaped reinforcing elements that suffer from the above problems.

Concrete structures are particularly susceptible to movement, especially to damage during an earthquake. The existing reinforcement that is used is however relatively rigid and does not have the ability to accommodate large deformations, such as those caused during an earthquake. Accordingly, existing concrete structures, tend to develop fractures that can lead to catastrophic structural failure.

Furthermore, in certain circumstances there is the need for impact resistant concrete structures, such as in the case where the structure comes under attack with armaments from foreign military powers or other hostile entities. There is therefore the need for concrete structures that can resist or at least minimise the damage of missiles or explosive devices.

The term "resist" or "resistant" used throughout the specification in relation to earthquakes and impact force should be understood to mean that the concrete structure of the present invention has a greater resilience to the result force applied to it compared to conventional reinforced concrete structures. The phrase "forming" used throughout the specification will be understood by the reader to relate to the addition of a flowable concrete mixture into formwork or the like, to cover a reinforcement assembly held therein and thereby create the concrete structure.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

It is therefore an object of the illustrated embodiments to provide an improved reinforced concrete structure with greater resilience to forces resulting from rapid earth movement or impact on the structure, compared to existing reinforcement. Other objects of the illustrated embodiments are to overcome at least some of the aforementioned problems, or at least provide the public with a useful alternative. The foregoing objects should not necessarily be considered as cumulative and various aspects of the invention may fulfil one or more of the above objects.

The invention could broadly be understood to comprise a reinforced concrete structure comprising a reinforcement assembly embedded therein, the reinforcement assembly including first and second lengths of chain, wherein the first and second lengths of chain being pretensionable prior to forming the concrete structure.

In one aspect of the invention, but not necessary the broadest or only aspect, there is proposed a reinforcement assembly for a concrete structure being formed using a formwork or mould, comprising:

- a plurality of spaced apart first lengths of chain having opposite tetherable ends;
- a first pretensionable member or members, and/or resiliently deformable member or members, attachable between at least one of said tetherable ends of the first lengths of chain and a first link member or members;
- a plurality of spaced apart second lengths of chain having opposite tetherable ends, the plurality of second lengths of chain at an angle to the first lengths of chain;

a second pretensionable member or members, and/or resiliently deformable member or members, attachable between at least one said tetherable ends of the second lengths of chain and a second link member or members; and wherein the link member or members being attachable to or extendable through the formwork or mould, wherein, in use, the reinforcement assembly being adjustable to pretension the first and second lengths of chain prior to a concrete mixture being poured into the formwork or mould, whereby the pretensioned reinforcement assembly being embedded within the resultant concrete structure.

The reinforcement assembly in accordance with claim 1, further including:

a first mounting block intermediate of the first pretensionable member or members, and/or resiliently deformable member or members, and the first link member or members;

a second mounting block intermediate of the second pretensionable member or members, and/or resiliently deformable member or members, and the second link member or members; and wherein the first link member or members, and second link member or members are attachable to or extendable through each of the first and second mounting blocks.

The resiliently deformable member may in one form be a spring, such as but not limited to, a helical spring, or a block of resiliently deformable material. The pretensionable member may, in one form, be a turnbuckle or other adjustable device.

The reader will appreciate that the reinforcement assembly may include both pretensionable members and resiliently deformable members. In other forms the reinforcement assembly may include only pretensionable members or resiliently deformable members.

Preferably the first lengths of chain are parallel and the second lengths of chain are parallel and at an angle to the first lengths of chain. The first lengths of chain and second lengths of chain may be interwoven or overlayed to thereby form a crossed mesh configuration. The first and second lengths of chain may also be joined or fixed at an intersection or intersections thereof.

In one form the parallel second lengths of chain may be perpendicular to the parallel first lengths of chain. Alternatively, the parallel second lengths of chain may be oblique to the parallel first lengths of chain.

In another form first, second and third lengths of chain may be used to create generally triangular voids, vertically through the reinforcement assembly. Additional lengths of chain may also be interwoven or overlayed. The chain lengths may be positioned in a perpendicular, web or other predetermined configuration.

The individual first lengths of chain may be spaced apart along a generally horizontal plane and the individual second lengths of chain may be spaced apart along generally the same horizontal plane. Alternatively, the different lengths of chain may extend along different planes that may be parallel with or offset from each other.

Preferably the opposite tetherable ends of each of the first lengths of chain may be connected to respective primary mounting blocks by respective pretensionable members and/or resiliently deformable members. Similarly, the opposite ends of each of the second lengths of chain may be connected to respective secondary mounting blocks by respective pretensionable members and/or resiliently deformable members. Accordingly, in one form the concrete structure includes two spaced apart primary mounting blocks that are connected by the first lengths of chain, and two spaced apart secondary mounting blocks that are connected by the second lengths of chain, all of which are embeddable in the concrete structure.

The primary mounting blocks may therefore be positioned adjacent either end of the first lengths of chain and secondary mounting blocks are positioned adjacent either end of the second lengths of chain.

In another form one end of the first lengths of chain and/or the second lengths of chain may be connected directed to the respective primary or secondary mounting blocks. In the immediately preceding form the resiliently deformable members are only positioned at one end of the respective first or second lengths of chain.

In one form, a first end of each of the first lengths of chain are tethered to a respective pretensionable member and/or resiliently deformable member, which is in turn connected to the primary mounting block. In another form a plurality of first ends of the first lengths of chain are tethered to a coupling that is connectable to a single or multiple pretensionable member and/or resiliently deformable member. Similarly, a first end of each of the second lengths of chain may be tethered to respective pretensionable member and/or resiliently deformable member, or to a coupling that has a single or multiple pretensionable member and/or resiliently deformable member attached thereto.

A second tetherable end of each of the first lengths of chain and second lengths of chain may be connectable to a respective fixing point or points. In another form the second end of each of the first lengths of chain and second lengths of chain are tethered to respective mounting blocks either directly or collectively by way of respective pretensionable members and/or resiliently deformable members.

In one form, each link member or members includes a respective additional or alternate tensionable device that, in use, is positionable external to the formwork or accessible from an exterior thereof. The link member or members may include a linkage that extends between a corresponding mounting block and a respective tensionable device. In one form the tensionable device is removable once the concrete structure has cured. The link member or members is/are preferably constructed from a material that has low corrosion characteristics. In another form the opening through which the link member extends is sealable to inhibit corrosion of the reinforcement assembly embedded within the concrete structure.

The pretensionable member or members may bear against the formwork such that as the reinforcement assembly is tightened the mounting block is pulled towards the formwork or edge of the mould, to thereby tension the lengths of chain. In another form, the link member or members may be coupled to a respective anchor that is positioned external of the formwork or mould, and at a distance therefrom. The anchor may be a peg or stake that can be driven into the ground at a distance from the formwork. Alternatively, the anchor may be a coupling that is connected to an existing structure. In one form one end of the first and/or second lengths of chain may be connected to an existing structure such as an existing concrete slab or an anchor point on a wall, foundation or other structure.

A pretensionable member and/or resiliently deformable member may be located at only one end of the first and second lengths of chain, or pretensionable members and/or resiliently deformable members may be located at both ends of the first and second lengths of chain.

Preferably the linkage extends through an opening in the formwork to thereby hold the mounting blocks at the correct height within the formwork and therefore within the resultant concrete structure. The opening may be sealable with an appropriate plug.

The reinforcement assembly may include lifting couplings to permit the attachment of lifting lungs used to move precast concrete structures. The lifting lugs may be removably attachable to the lifting couplings or the reinforcement assembly may include integral lifting lugs. The lifting lungs are preferably connected to, at least some of, the lengths of chain thereby providing greater strength when lifting the precast concrete structure to avoid dropping of the concrete structure due to failure of the lifting lug or lugs.

In one aspect of the invention there is proposed an earthquake resistant structure incorporating the above reinforcement assembly. In another aspect of the invention there is proposed an impact resistant structure incorporating the above reinforcement assembly, which inhibits damage that may occur when the structure is impact by an armament, such as a missile or explosive device.

The concrete structure may include a heat-proof coating, such as an intumescent coating that swells up when heated, thereby protecting the concrete in the event of a fire. Alternatively, the concrete structure may incorporate a fire-retardant additive that inhibits or at least delays damage during a fire event.

The reader should now appreciate that the reinforcement assembly acts in a similar way to a shock absorber during an earthquake or when impacted, such as by a vehicle, missile or other armament.

In another aspect of the invention there is proposed a reinforced concrete structure comprising a reinforcement assembly embedded therein, the reinforcement assembly including first and second lengths of chain, a plurality of pretensionable members and/or resiliently deformable members, and a plurality of mounting blocks, wherein, in use, the pretensionable members and/or resiliently deformable members are positionable intermediate of the first length of chain or the second length of chain and one of the plurality of mounting blocks, whereby the first and second lengths of chain being pretensionable prior to forming of the concrete structure.

In another aspect of the invention there is proposed a method of reinforcing a concrete structure including the steps of:

- constructing a temporary formwork, or providing a mould, which delineates a boundary of a desired concrete structure;
- positioning a reinforcement assembly inwardly of the formwork or mould, the reinforcement assembly comprising lengths of chain, mounting blocks,
- pretensionable members and/or resiliently deformable members, and link members which are attachable to the mounting block and configured to, in use, extend through or over the formwork or mould, wherein the pretensionable members and/or resiliently deformable members are positionable intermediate of at least one end of some of the lengths of chain and a corresponding mounting block;
- adjusting the link members and/or pretensionable members to thereby tension the lengths of chain;
- pouring a concrete mixture into the formwork or mould to form the concrete structure;
- allowing the concrete mixture to cure; and
- removing the framework, or removing the concrete structure from within the mould, wherein the lengths of chain are maintained in a pretensioned condition within the concrete structure.

The above method wherein parallel, spaced apart first lengths of chain are positionable perpendicular or at an angle to parallel, spaced apart second lengths of chain, and respective mounting blocks are positionable adjacent both ends or one end of each of the first and second lengths of chain The above method including the further step of interweaving or overlaying the first and second lengths of chain.

The above method wherein a plurality of third, or more, lengths of chain are interwoven with, or overlay, the first and second lengths of chain.

The above method including the step of using a crane to lift the concrete structure so that is can be positioned onsite, wherein lifting lugs are connectable to at least some of the lengths of chain.

BRIEF DESCRIPTION OF THE DRAWINGS

The accompanying drawings, which are incorporated in and constitute a part of this specification, illustrate an implementation of the invention and, together with the description and claims, serve to explain the advantages and principles of the invention. In the drawings.

DETAILED DESCRIPTION OF THE ILLUSTRATED AND EXEMPLIFIED EMBODIMENTS

Figure 1:
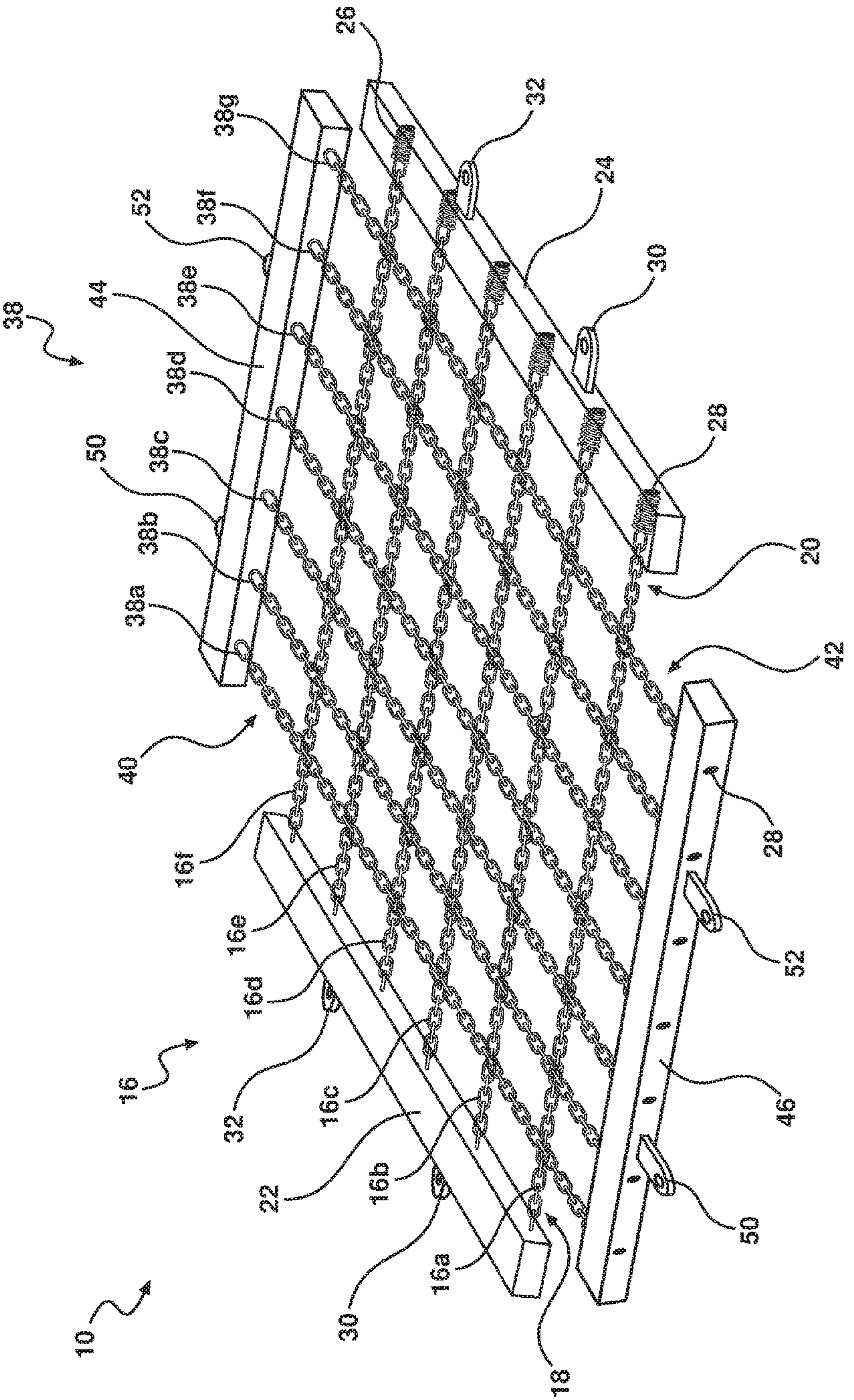
FIG. 1 is a perspective view of an embodiment of the reinforcement assembly for a concrete structure, illustrating some of the resiliently deformable members positioned within the mounting block.

Similar reference characters indicate corresponding parts throughout the drawings. Dimensions of certain parts shown in the drawings may have been modified and/or exaggerated for the purposes of clarity or illustration.

Figure 3:
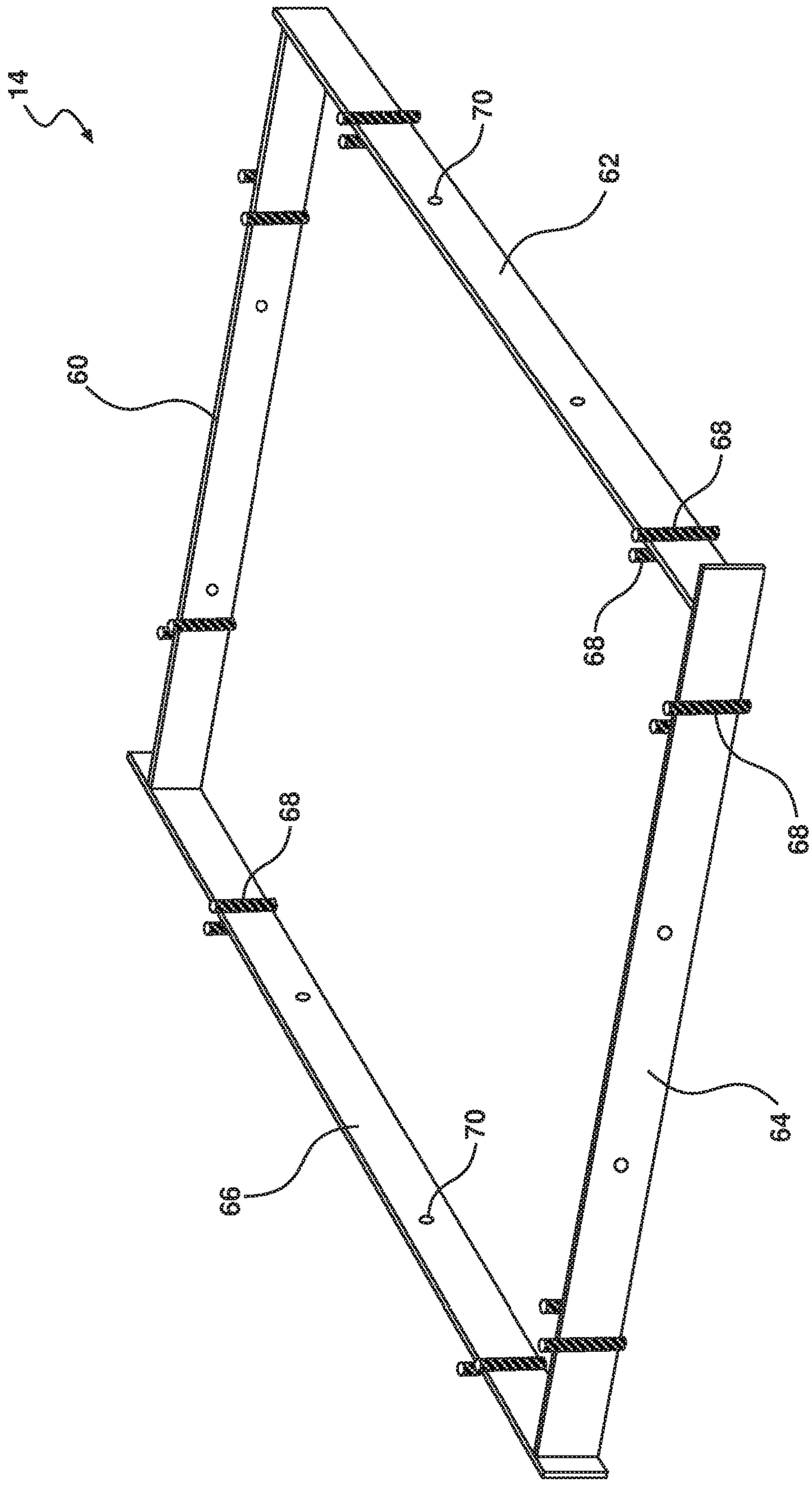
FIG. 3 is a perspective view of formwork used to delineate the edges of the concrete structure of FIG. 2.
Figure 4:
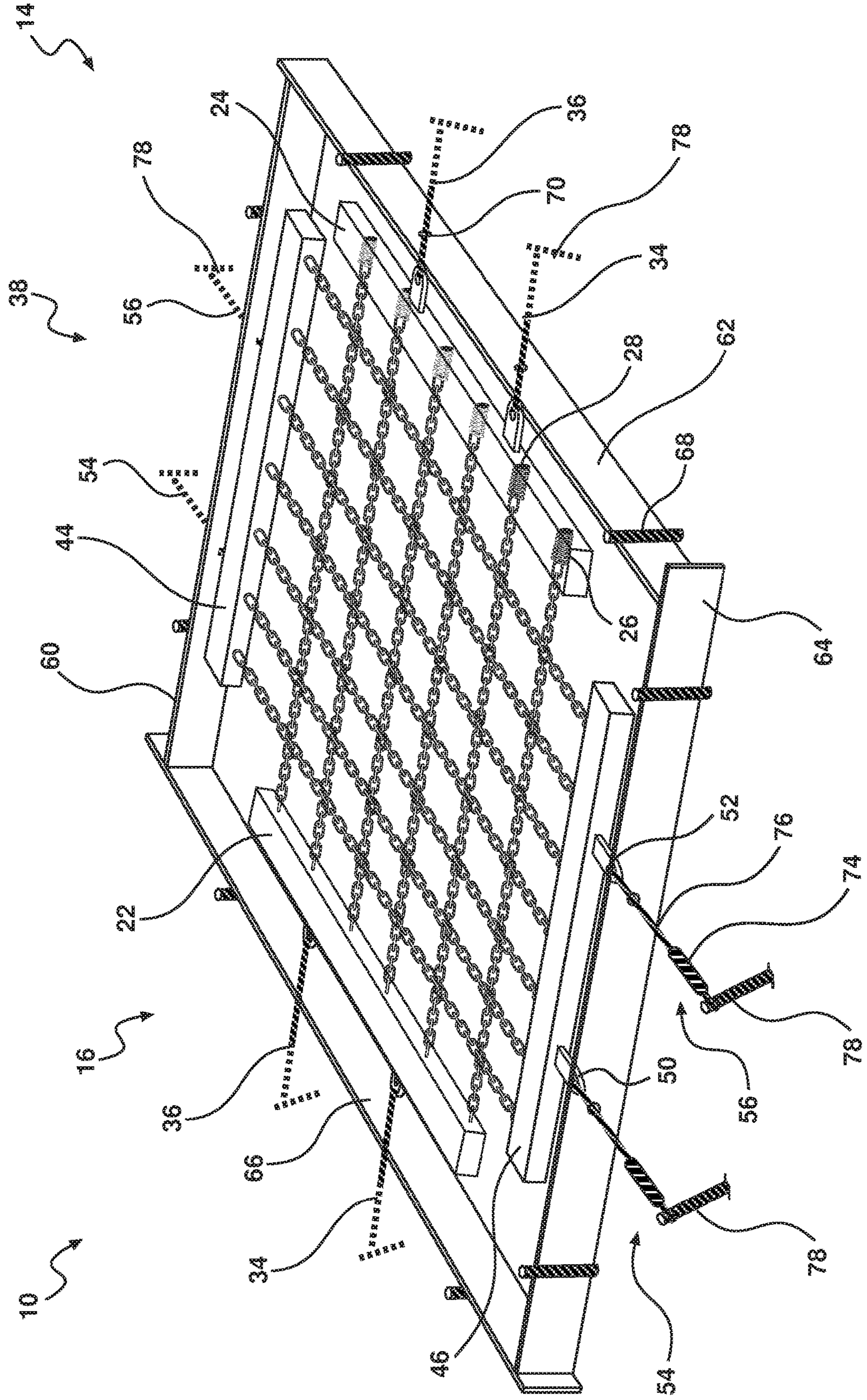
FIG. 4 is a perspective view of reinforcement assembly located within the formwork of FIG. 3 and connected to anchor points.
Figure 5:
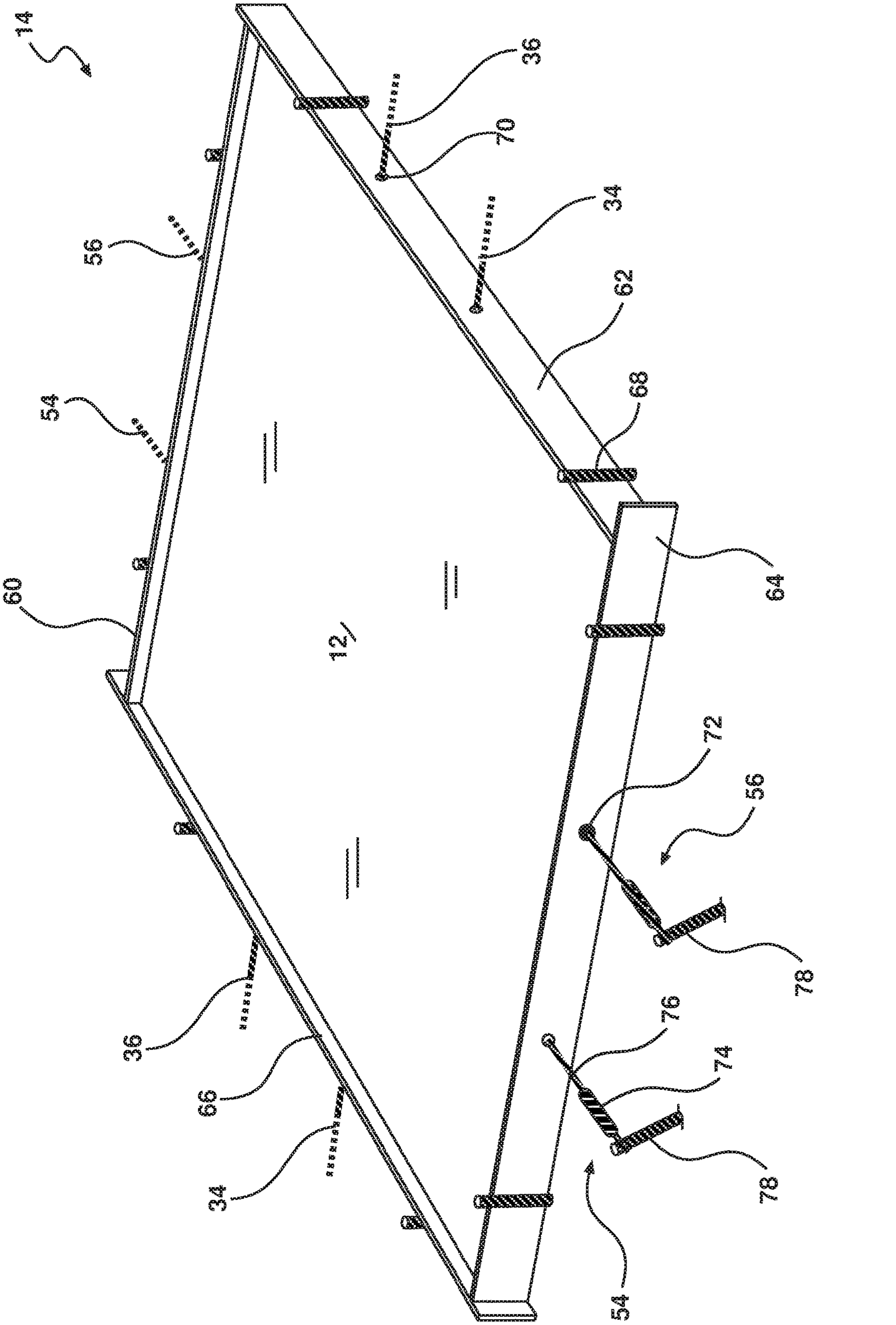
FIG. 5 is a perspective view of the formwork of FIG. 4 after a concrete mixture has been poured thereinto.

Referring to the drawings for a more detailed description, a reinforcement assembly 10 is illustrated, which can be embedded in a concrete structure 12, demonstrating by way of examples, arrangements in which the principles of the present invention may be employed. The concrete structure 12 may be poured into site-specific formwork 14, as illustrated in FIGS. 3 to 5 and allowed to cured onsite, or the concrete structure 12 is a precast concrete structure that is produced offsite within a mould or formwork and then transport and lifted into place onsite. It will be appreciated by the reader that the formwork or mould serves the same function and therefore any reference to the formwork 14 throughout the specification also encompasses the idea of a mould.

As illustrated in FIG. 1, the reinforcement assembly 10 includes a plurality of generally parallel spaced apart first lengths of chain 16*a* to 16*f*, each having opposite tetherable ends 18 and 20. The skilled addressee will appreciate that six first lengths of chain are illustrated in the figures but the number of first lengths of chain may be more or less than six.

Primary mounting blocks 22, 24 are locate adjacent each of the opposite ends 18, 20 of the first lengths of chain, collectively referred to as lengths of chain 16.

In the present embodiment, resiliently deformable members 26 are positioned intermediate of each end 18 and 20 of the first lengths of chain 16 and the respective 30) primary mounting block 22 or 24. The resiliently deformable members 26 are connected to a corresponding fixing point 28 on the primary mounting block 22 or 24. The resiliently deformable members 26, as illustrated in the figures, may be a helical or coiled spring, however the reader should appreciate that other resiliently deformable members could be used without departing from the scope of the invention. Furthermore, it should be appreciated that springs may be located at a distance from the mounting blocks and intermediate of portions of chain wherein two portions of chain form an elongate length of chain, or the springs may connect portions of chains that are perpendicular or at an angle to each other.

FIG. 1 only illustrates the resiliently deformable members 26 that are connected to primary mounting block 24, however it should be appreciated that primary mounting block 22 may also have respective resiliently deformable members 26 attached thereto. Alternatively, only end 20 of the first lengths of chain 16 may have a resiliently deformable member 26 attached thereto and the other end 18 is simply connected directly to a fixing point on the mounting block 22.

The primary mounting blocks 22, 24 each include couplings 30, 32, for engaging link members 34, 36, as illustrated in FIG. 4.

The assembly 10 further includes a plurality of generally parallel spaced apart second lengths of chain 38*a* to 38*g* each having opposite tetherable ends 40 and 42. The skilled addressee will appreciate that seven second lengths of chain are illustrated in the figures but the number of second lengths of chain may be more or less than seven. As illustrated in the figures the number of first and second lengths of chain may be different, however it should be appreciated that the number of first and second lengths of chain may alternatively be the same.

Secondary mounting blocks 44, 46 are locate adjacent each of the opposite ends 40, 42 of the second lengths of chain, collectively referred to as lengths of chain 38.

Although not illustrated, resiliently deformable members 26 may be positioned intermediate of one or both ends 40, 42 of the second lengths of chain 38 and the respective primary mounting block 44 or 46. The resiliently deformable members 26 are connected to a corresponding fixing point 28 on the mounting block 22 or 24.

The secondary mounting blocks 44, 46 each include couplings 50, 52, for engaging link members 54, 56, as illustrated in FIG. 4.

Figure 2:
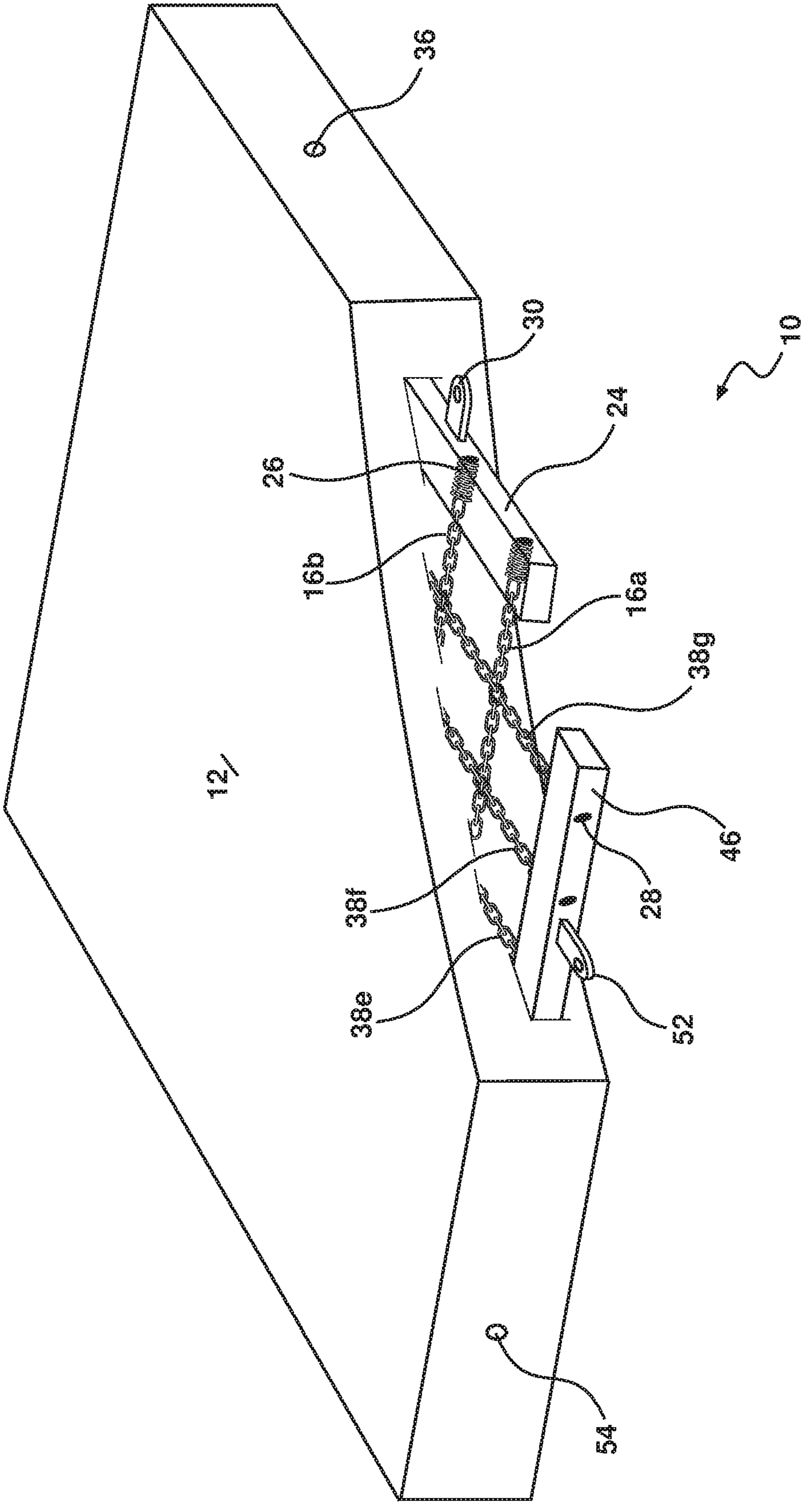
FIG. 2 is a perspective view of the reinforcement assembly of FIG. 1 embedded within the concrete structure, with a portion of the concrete structure removed.

FIG. 2 illustrates the reinforcement assembly 10 embedded within the resultant concrete structure 12, showing a portion of the concrete structure 12 removed to show the reinforcement assembly 10 that is held in a tensioned condition therein. FIG. 2 also illustrates how the link members extend through the outer edge of the concrete structure 12. In the present figure only link members 36 and 54 are illustrated however the reader will appreciate that the same is true about link members 34 and 56.

The skilled addressee will also appreciate that the concrete extends through each of the chain links, rather than just around the reinforcement, as is the case with existing reinforcement rods. The inventor envisages that this configuration will improve structural integrity and assist in maintaining the position of the chain within the concrete structure.

The link members may end at the outer edge of the concrete structure 12, as illustrated in FIG. 2, or they may be cut so that they do not extend outwardly. The link members 34, 36, 54, 56, are constructed from a material having low corrosion characteristics or a plug (not shown) may encase the link members to seal them from the external environment.

As illustrated in FIG. 3, a site-specific formwork 14 is constructed using boards 60, 62, 64, 66, which are held in an upright position by stakes 68. The site-specific formwork 14 is used to delineate the external edges of the concrete structure 12. As further illustrated in FIG. 3, each of the boards 60, 62, 64, 66 have openings 70 through which a respective link member can pass to thereby hold the mounting blocks at the correct height within the concrete structure 12. In use the 20) opening may be sealable with an appropriate plug 72, as shown in FIG. 5.

The reader should however appreciate that the present invention is not limited to the use of the illustrated site-specific formwork and a reusable mould may be used to produce precast concrete structures. Accordingly, the configuration of the illustrated formwork is simply provided as an example to assist in the explanation of the invention.

As illustrated in FIG. 4, each of the link members 54 and 56 that are connected to mounting block 46 include an additional tensionable device 74 and a linkage 76. The tensionable device 74 may be external to the formwork 14 as illustrated in FIG. 4, or it may be accessible from an exterior of the formwork 14. The linkage 76 extends between the mounting block 46 and tensionable device 74. The tensionable device 74 is coupled to an anchor stake 78 that is positioned external of the formwork 14 and at a distance therefrom. As the reader will appreciate that, although not illustrated, the link members 34, 36, 54 and 56 attached to mounting blocks 22, 24, and 44 may have a similar configuration.

FIG. 5 illustrates the formwork 14 once a concrete mixture has been poured. The wet concrete is allowed to cure and then the tensionable devices 74 are released and detached from the linkage 76. The boards 60, 62, 64, 66 can then be removed in a conventional manner. Since the concrete has now cured the reinforcement assembly 10 is held in a tensioned condition therein.

The reader should appreciate that the tensionable device 74 may not be secured to a stake 78, rather it may be configured to bear against the formwork 14 such that, as the lengths of chain are tensioned, the mounting blocks are pulled towards an adjacent board 60, 62, 64, 66 of the formwork 14. For instance, a U-shaped steel channel RSJ column with holes could be fixed to the formwork 14 to provide an anchor point for a pretensionable member 79.

The reader will however appreciate that the lengths of chain may also be connected at one or both ends to an existing structure such as an existing concrete slab or an anchor point on a wall or foundation (not shown).

Figure 6B:
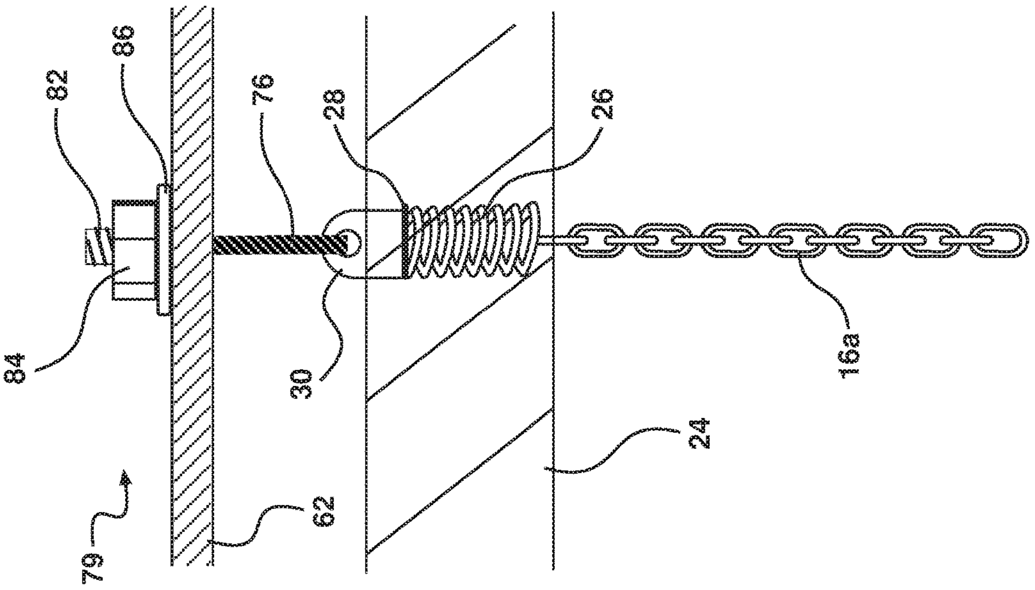
FIG. 6*b* is a top schematic view of the anchor point of FIG. 6*a* in a tightened arrangement.
Figure 6A:
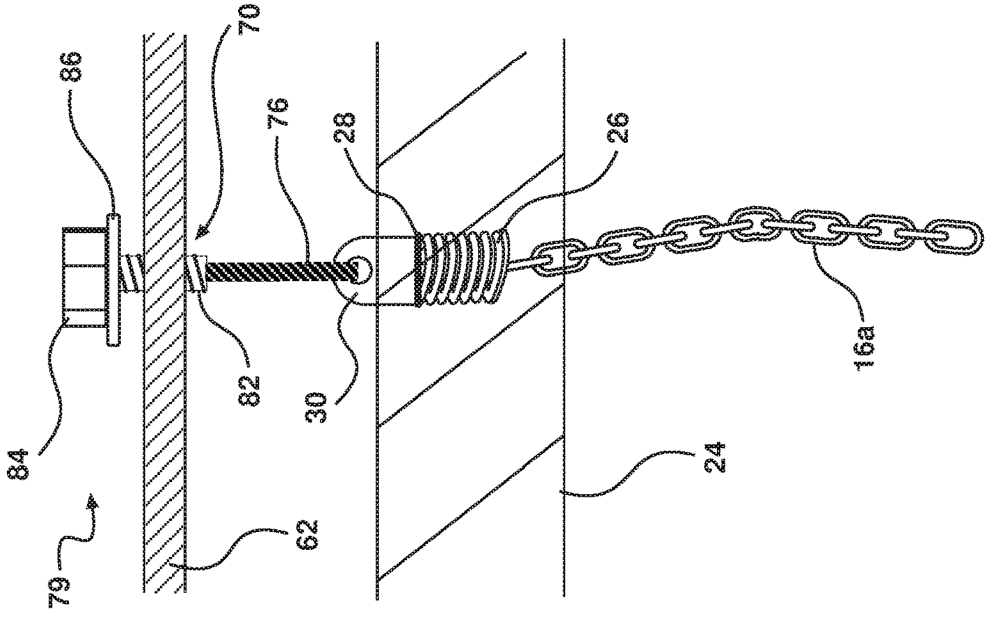
FIG. 6*a* is a top schematic view of another embodiment of the anchor point of the reinforcement assembly.

FIG. 6*a* illustrates an embodiment of the pretensionable member 79 that bears against the formwork 14. In the present embodiment the pretensionable member 79 comprises a threaded shaft 82, a hex nut 84 and washer 86. The threaded shaft 82 is connected to linkage 76 that is in turn connected to the coupling 30, which in the present embodiment is connected directly to fixing point 28 for the spring 26 attached to the length of chain 16*a*. As the hex nut 84 is lightened onto the threaded shaft 82 as illustrated in FIG. 6*b*, the mounting block 24 is pulled towards the board 62 that causes the length of chain 16*a* to be lightened. As further illustrated the spring 26 is also caused to slightly extend or is at least put under tension.

The reader should appreciate that in the situation where the spring 26 is caused to slightly extend, when the concrete mixture is poured it flows into the gaps between the coils and once hardened assists in maintaining the spring 26 in an expanded configuration. Therefore in the event of an earthquake or seismic activity it is envisaged that the spring 26 will be the first part of the reinforcement assembly 10 that will move and thereby allow a degree of movement within the concrete structure 12 that will inhibit catastrophic failure of the structure 12. The internal movement of a portion of the reinforcement assembly 10 within the concrete structure 12, when under extreme stress, will provide structures that have greater strength whilst improving seismic or impact resistance.

Figure 7:
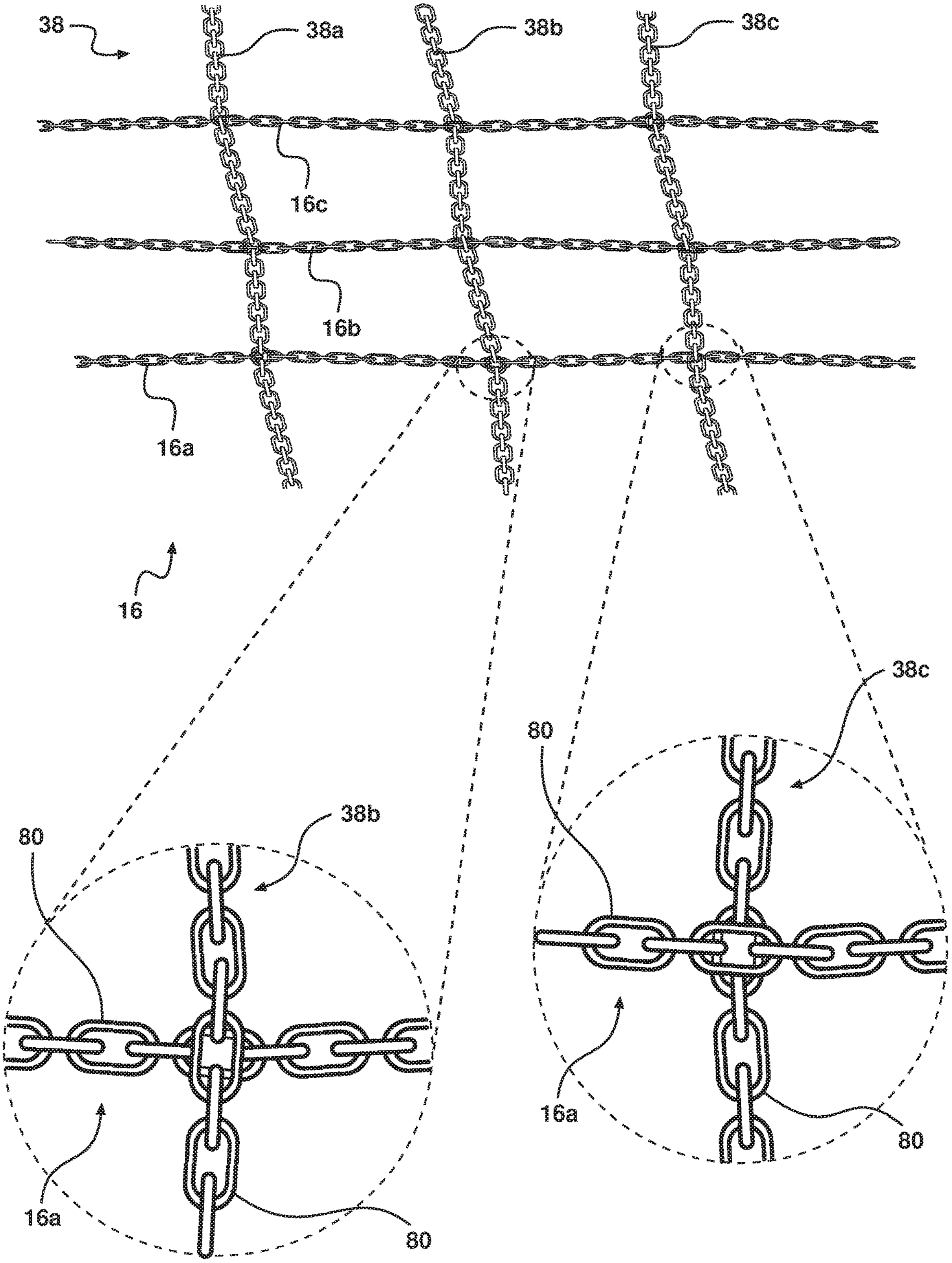
FIG. 7 is a perspective view of the first and second lengths of chain illustrating an interwoven configuration.

As illustrated in FIG. 7, the first and second lengths of chain 16 and 38 are interwoven to thereby form a mesh. As shown in the enlarged portion on the left of FIG. 7 the chain links 80 of the length of chain 16*a* pass under the chain links 80 of the length of chain 38*b*. Then as shown in the enlarged portion on the right of FIG. 7 the chain links 80 of the length of chain 16*a* pass over the chain links 80 of the length of chain 38*c*. This interweaving of the chain lengths 16, 38 increases the 10) strength of the concrete structure 12 by inhibiting laminating of the concrete along horizontal lines of weakness that could lead to stress fractures. It should however be appreciated that the chains may only be partially interwoven, or overlay, or overlaying lengths of chain may be coupled to the underlying lengths of chain by a coupling or fixing clip or resiliently deformable member.

Figure 8:
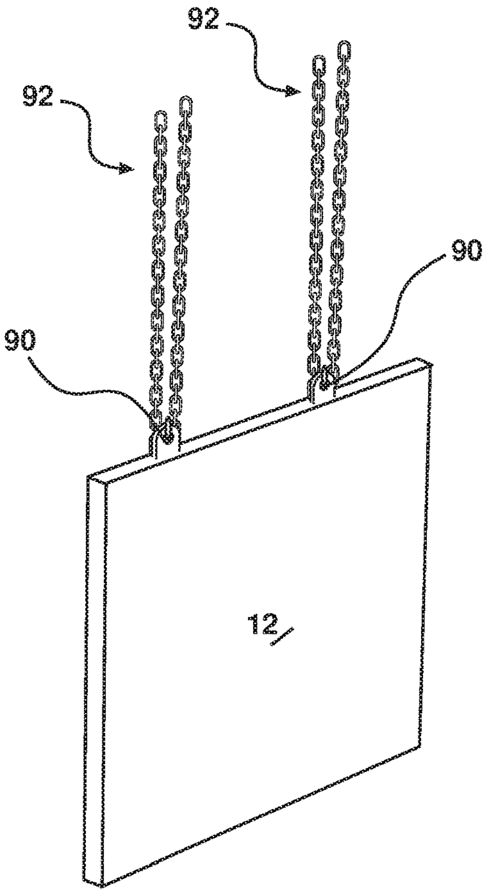
FIG. 8 is a perspective view of the precast concrete structure being lifted by way of lifting lugs.
Figure 9:
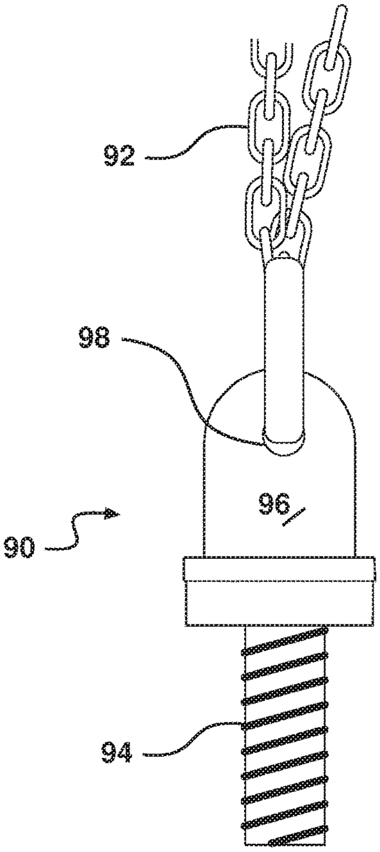
FIG. 9 is a side view of the lifting lug of FIG. 8 attachable to the precast concrete structure.
Figure 10:
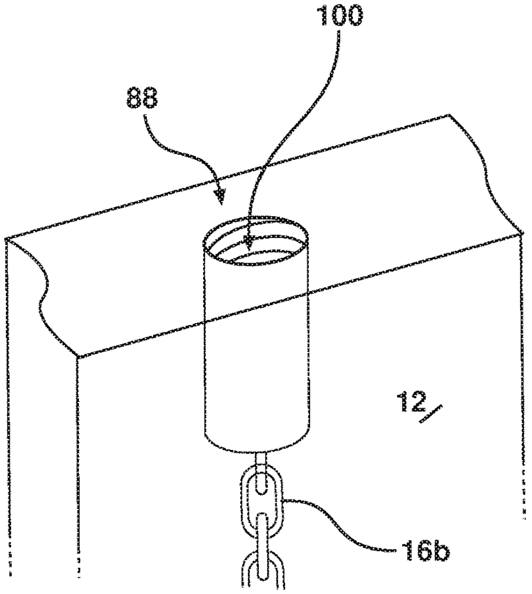
FIG. 10 is a schematic view of the precast concrete structure illustrating the lifting couplings to which the lifting lung of FIG. 9 is attachable.

As illustrated in FIGS. 8 to 10, the reinforcement assembly 10 includes lifting couplings 88 to permit the attachment of lifting lungs 90 used to move the precast concrete structures 12. In this way, the hoisting chains 92 of a crane (not shown) can be attached to lift and move the concrete structures 12.

In the present embodiment, the lifting lugs 90 are removably attachable to the 20) lifting couplings 88. As shown in FIG. 9, the lifting lug 90 includes a threaded shaft 94 and flange 96 having eyelet 98 for attachment of the hoisting chains 92. The threaded shaft 94 is configured to engage the threaded bore 100 of the lifting couplings 88, as shown in FIG. 10. In the present embodiment, the lifting couplings 88 is connected directly to the length of chain 16*b*, however the reader will appreciate that the lifting couplings 88 may be connected to one of the mounting blocks 22, 24, 44 or 46.

There are instance where the lifting lugs used in conventional precast panels have broken off, which can result in premature release of the panels and injury or possible death to personnel in the vicinity. Accordingly, one of the advantages with 30) having the lifting lungs 90 connected to at least some of the lengths of chain, is that the concrete structures 12 is more securely held while it is being moved because the lifting lungs 90 are connected to elements that extend through the body of the concrete panel 12.

Figure 11:
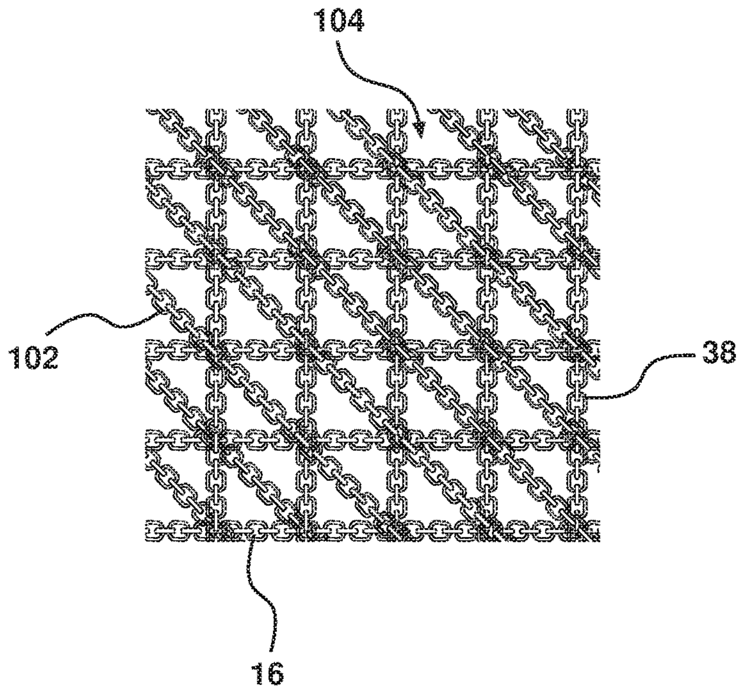
FIG. 11 is a top view of another embodiment of the chain configuration, illustrating first, second and third lengths of chain.

FIG. 11 illustrates another embodiment of the chain configuration showing first lengths of chain 16, second lengths of chain 38 and third lengths of chain 102 that are interwoven or overlayed to form generally triangular voids 104.

Figure 12:
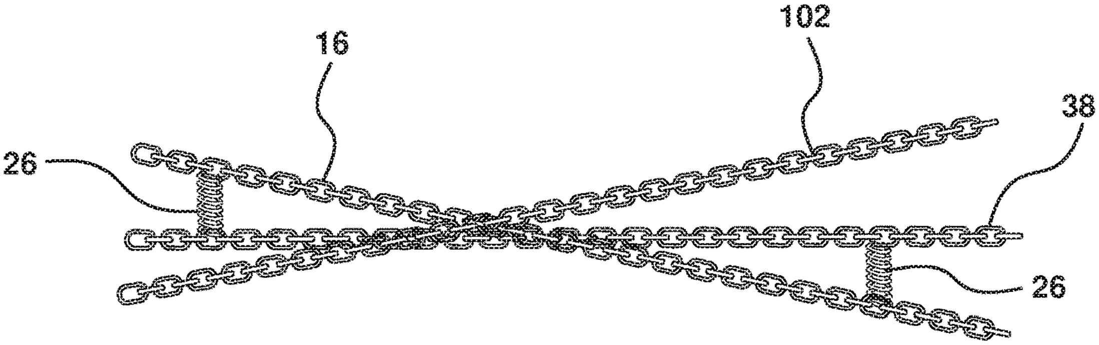
FIG. 12 is a top view of a chain configuration, illustrating first, second and third lengths of chain extending along different planes that are offset from each other.

As illustrated in the top view of FIG. 12 the first lengths of chain 16, second lengths of chain 38 and third lengths of chain 102 extend along different planes that are offset from each other. FIG. 12 also illustrates springs 26 that interconnect portions of chains that are at an angle to each other.

Figure 13:
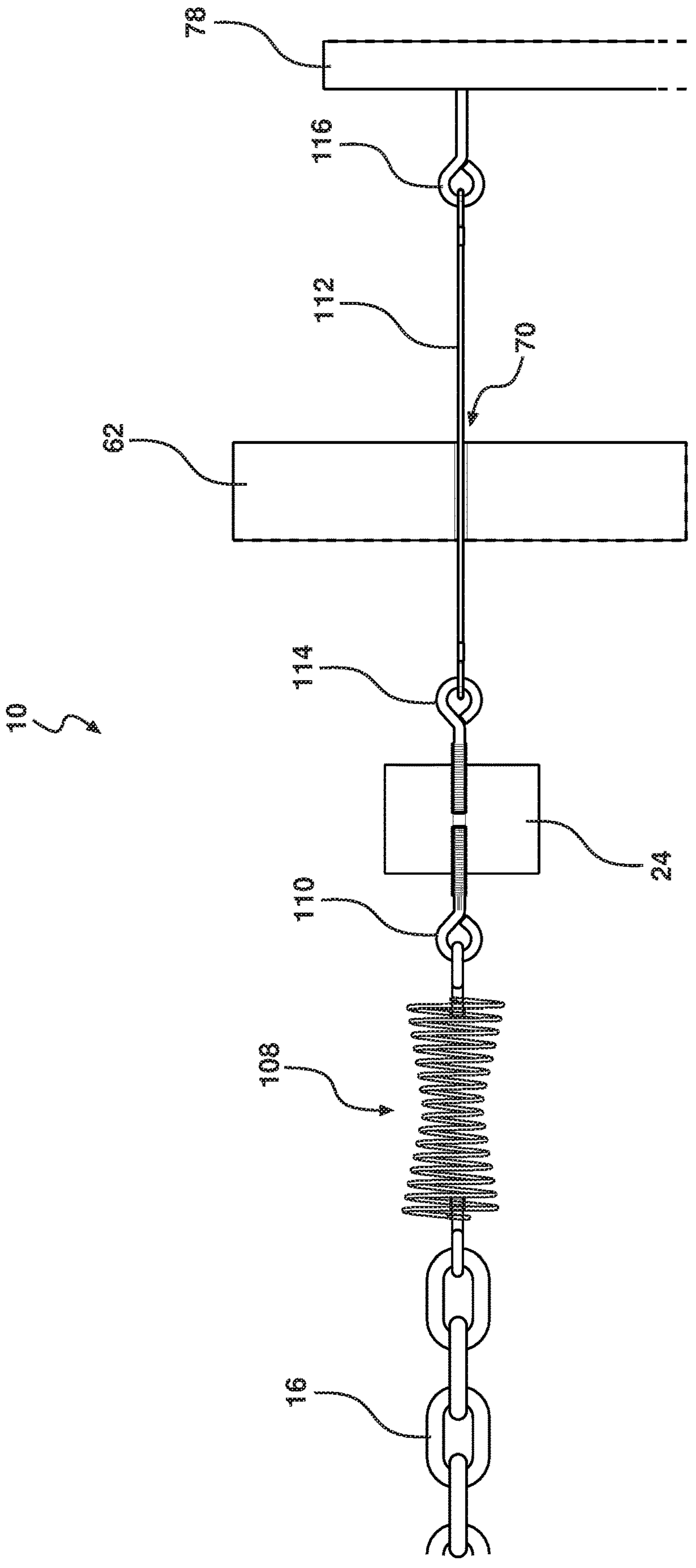
FIG. 13 is a side plan view of one embodiment of the resiliently deformable member, illustrating the use of an hourglass shaped spring.

In another embodiment, as illustrated in FIG. 13, the reinforcement assembly 10 includes a resiliently deformable member in the form of an hourglass shaped spring 108 that is coupled at one end to a length of chain 16 and the other to the mounting block 24 by way of eye bolt 110. The link member in the form of a cable 112 is connected to eye bolt 114, which is attached to the mounting block 24 on an opposite side. The cable 112 passes through aperture 70 in the formwork board 62 and is coupled to eye bolt 116 that is connected to stake 78.

Figure 14:
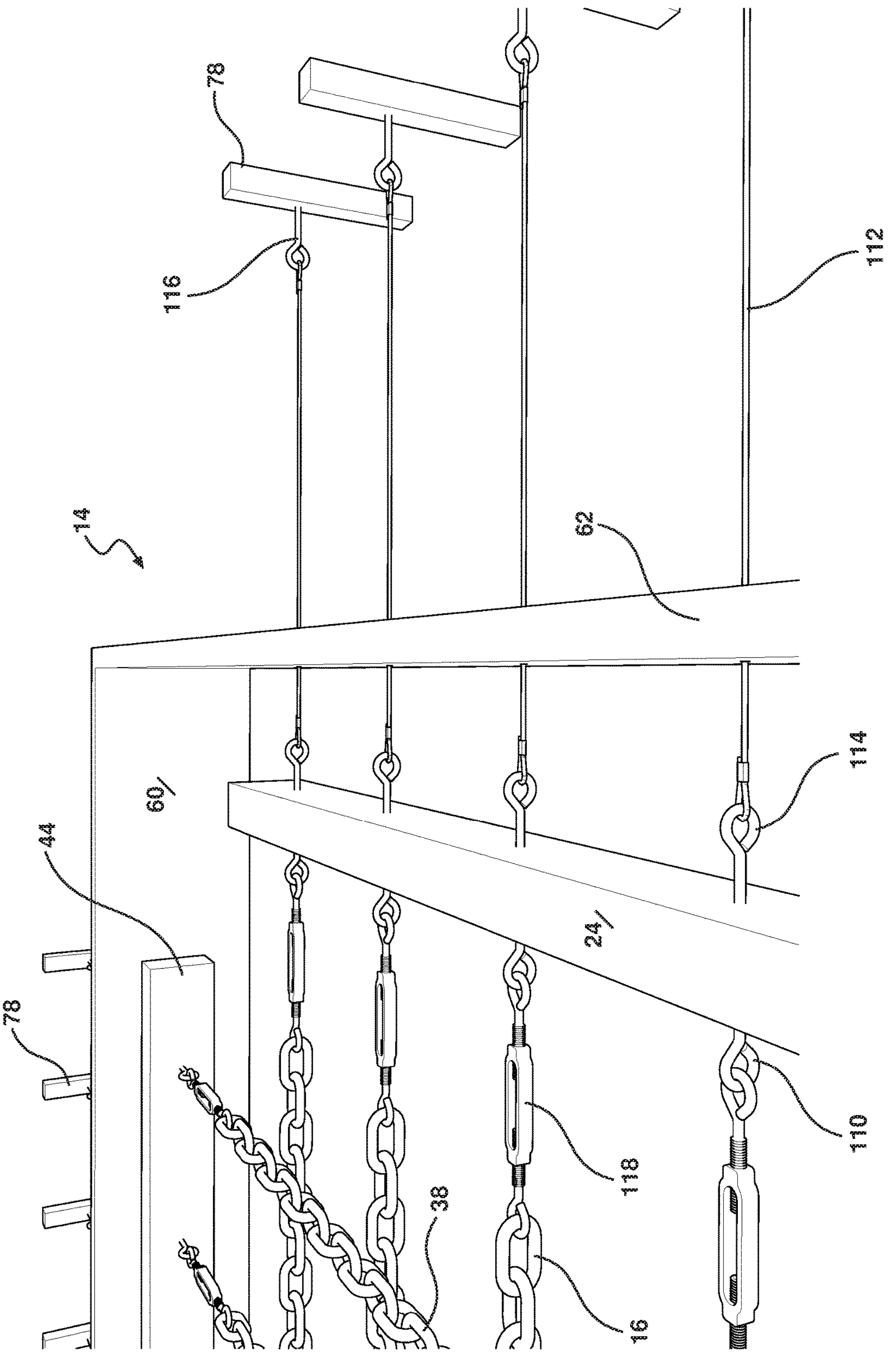
FIG. 14 is a partial perspective view of yet another embodiment of the reinforcement assembly.
Figure 15:
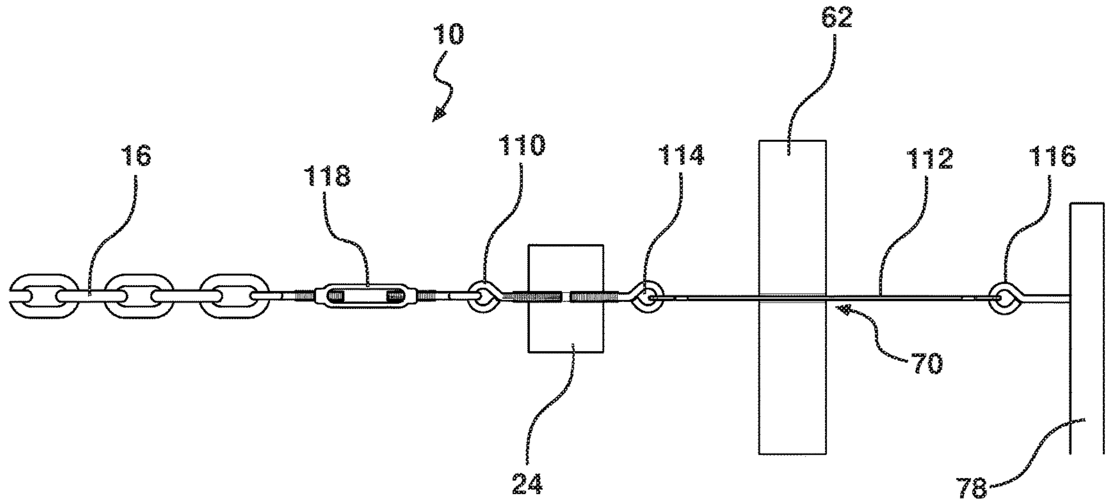
FIG. 15 is a side plan view of the pretensionable member of FIG. 14.

FIGS. 14 and 15 illustrate a similar configuration, to that of FIG. 13 but where the pretensionable member is in the form of a turnbuckle 118, in place of the spring.

Figure 16:
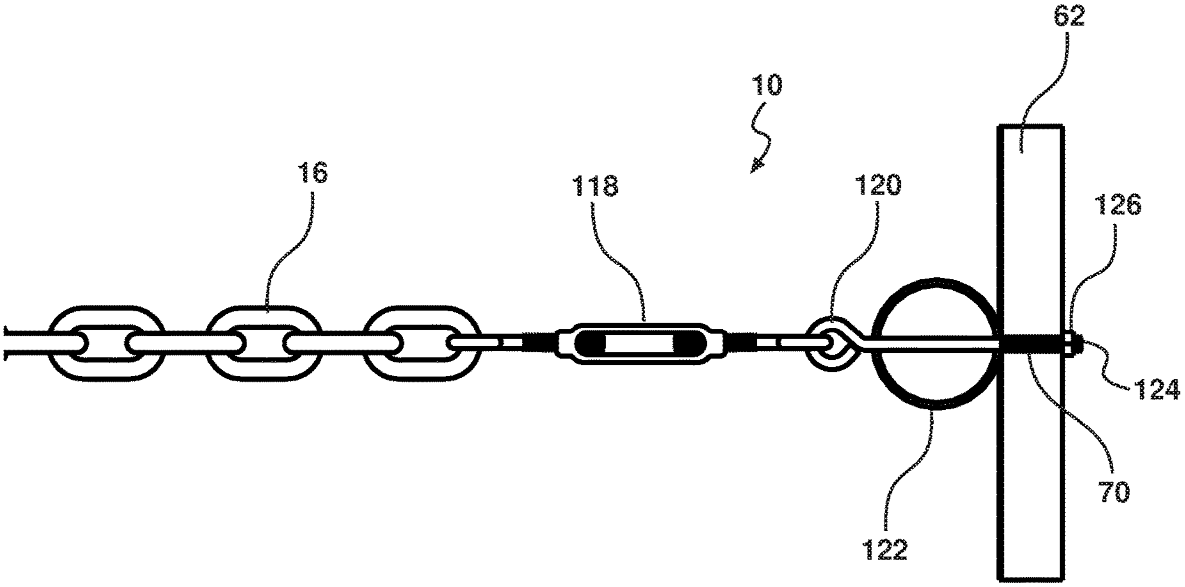
FIG. 16 is a side plan view of still one embodiment of the pretensionable member.
Figure 17:
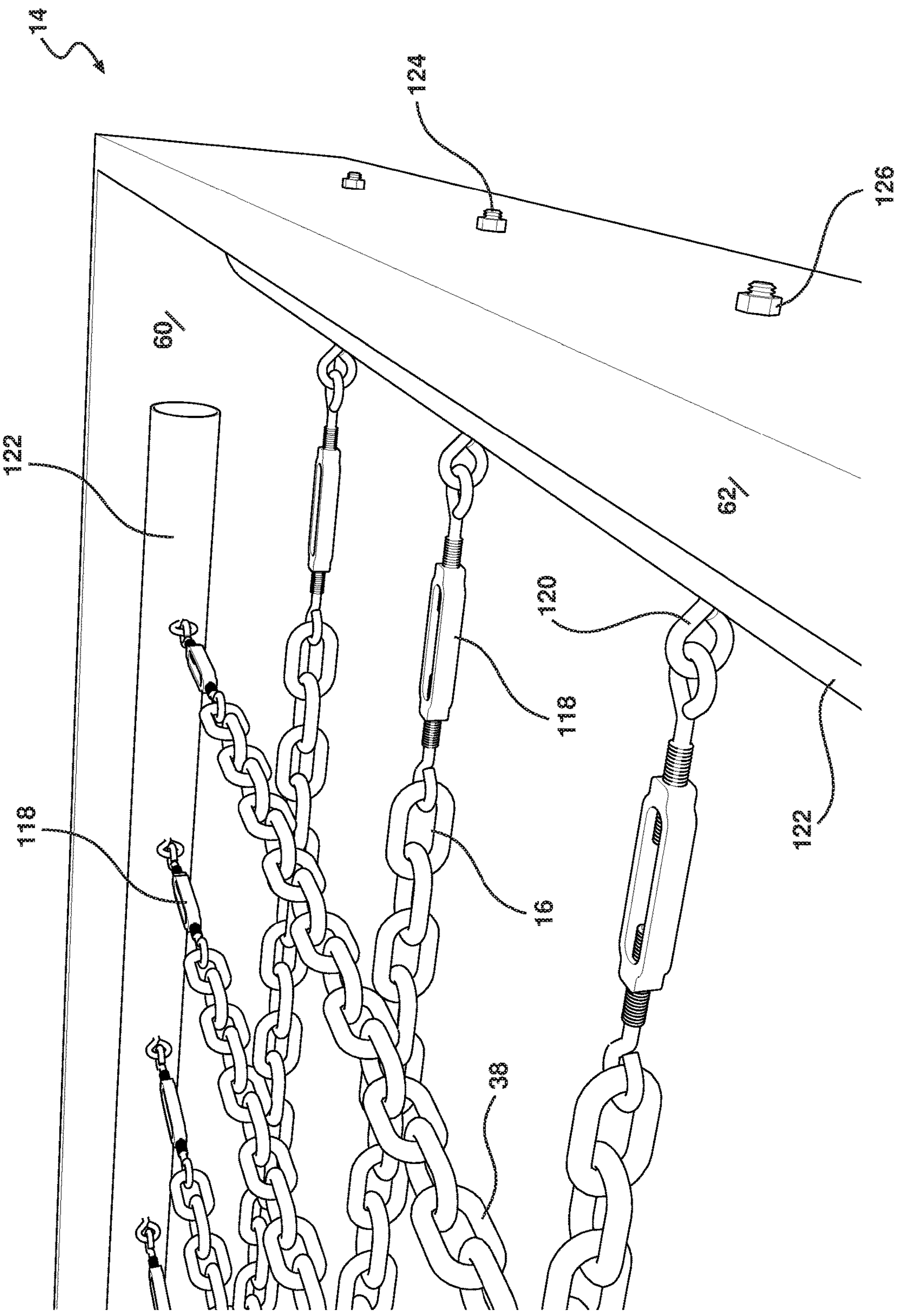
FIG. 17 is a perspective view of the reinforcement assembly of FIG. 16.

FIGS. 16 and 17 also illustrate the use of a turnbuckle 118, however in this configuration the turnbuckle 118 is connected to eye bolt 120 that engages through a 20) rigid pipe 122. An end 124 of the eye bolt 120 extends through aperture 70 in the formwork board 62 and is secured by nut 126. The rigid pipe 122 may be constructed from metal and is configured to be retained within an edge of the concrete structure 12 once formed. In another form, the eye bolt 120 is connected to a permanent structure such as an existing wall or support structure, in situations where the formwork board 62 in not required.

Figure 18:
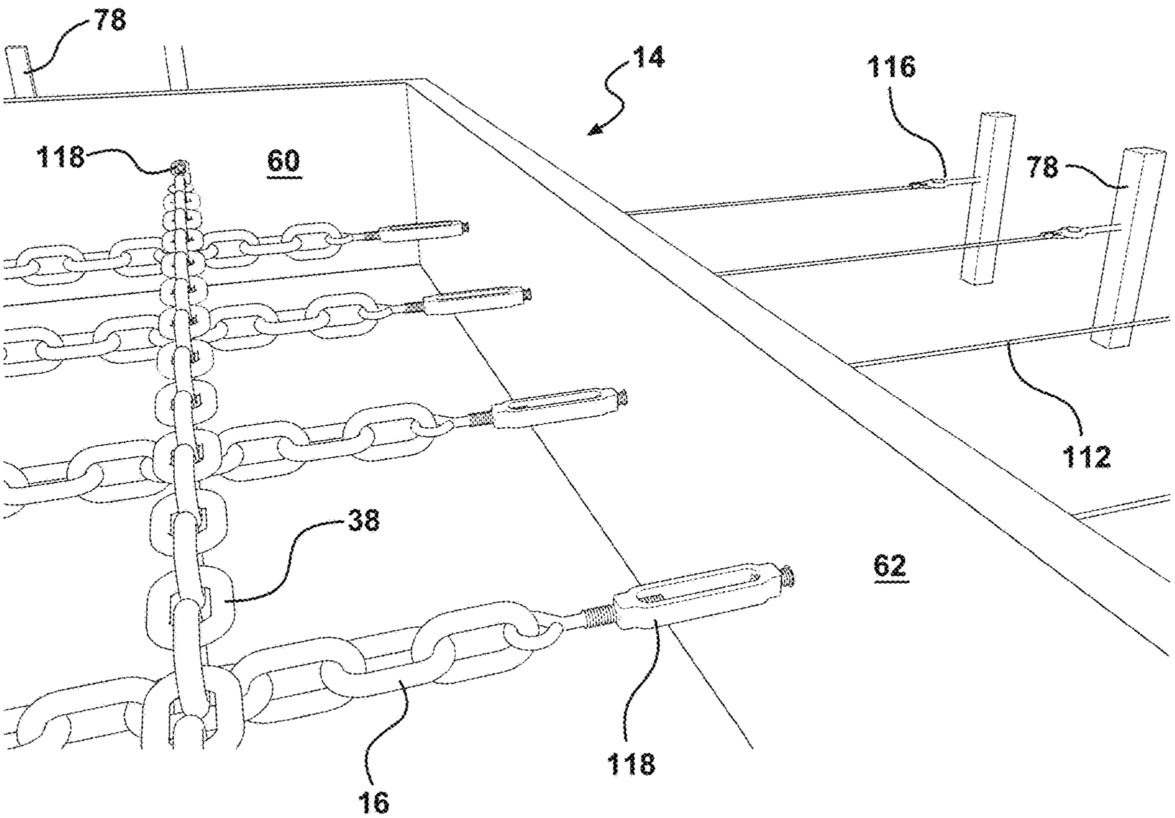
FIG. 18 is a perspective view of another embodiment of the reinforcement assembly.
Figure 19:
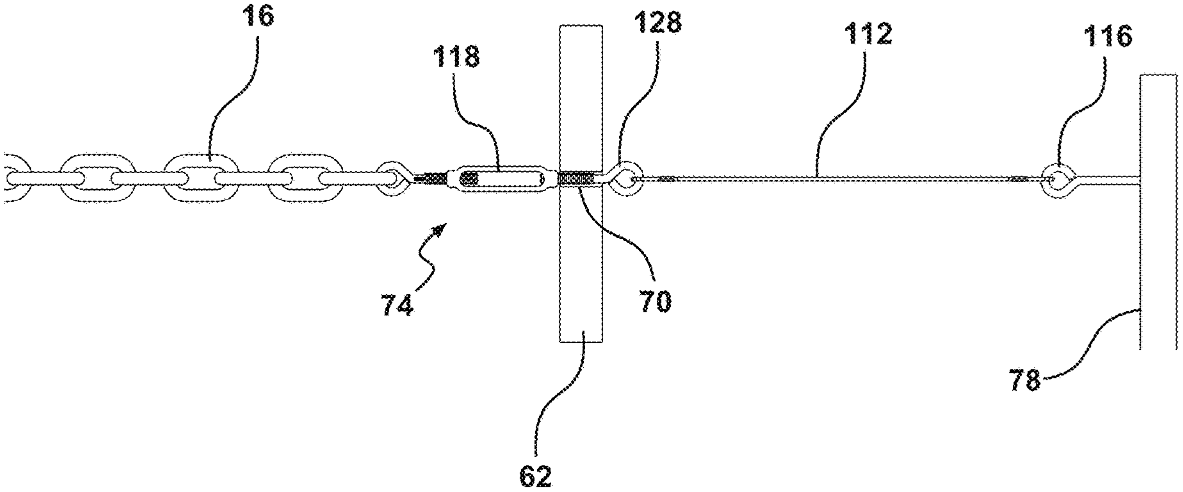
FIG. 19 is a side plan view of the pretensionable member of FIG. 18.

In yet another embodiment, as illustrated in FIGS. 18 and 19, the outer eye portion 128 of the turnbuckle 118 extends through the aperture 70 in the formwork board 62. In the present embodiment, when the concrete structure is sufficiently cured and the formwork board 62 is removed, by decoupled the outer eye portion 128 from the turnbuckle 118. The remaining open hole (not shown) in the side of the concrete structure 12 may be sealed with a suitable caulking material, if required.

Figure 20:
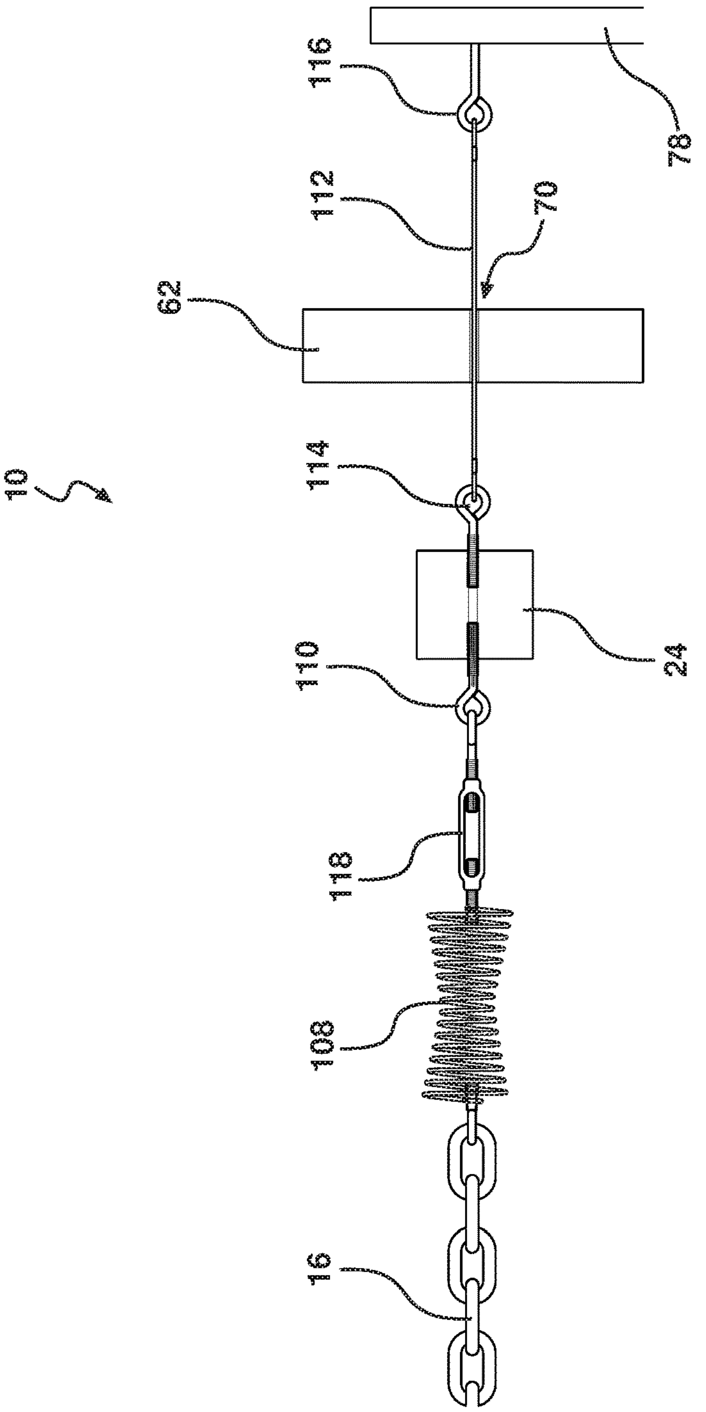
FIG. 20 is a side plan view of an embodiment of the reinforcement assembly including both a pretensionable member and a resiliently deformable member.

FIG. 20 illustrates another embodiment of the reinforcement assembly 10 that include both a pretensionable member 118, in the form of a turnbuckle, and a resiliently deformable member 108, in the form of an hourglass helical spring. The reader should appreciate that the although FIG. 20 illustrates the use of a mounting block 24, the pretensionable member 118 may in another embodiment be connected directly to the cable 112.

Figure 21:
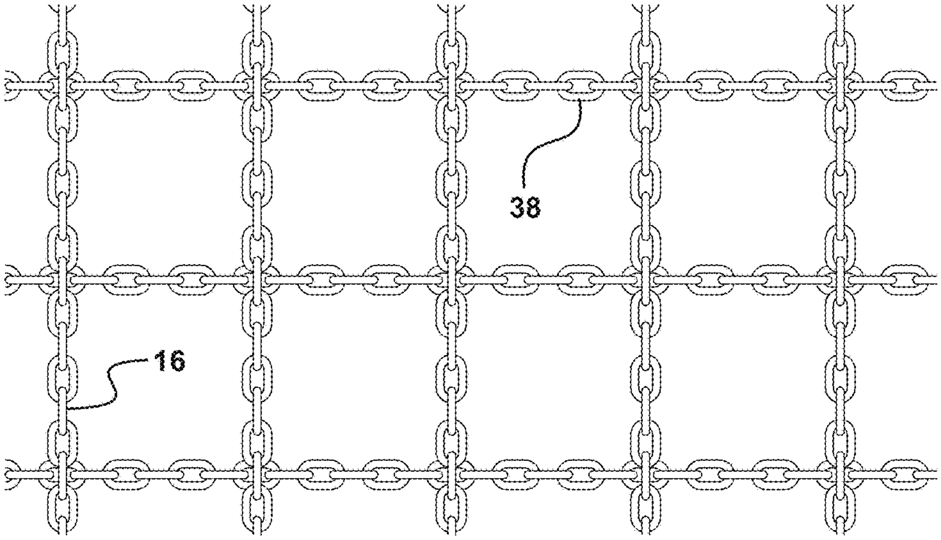
FIG. 21 is a top view of one layout of the lengths of chain.
Figure 22:
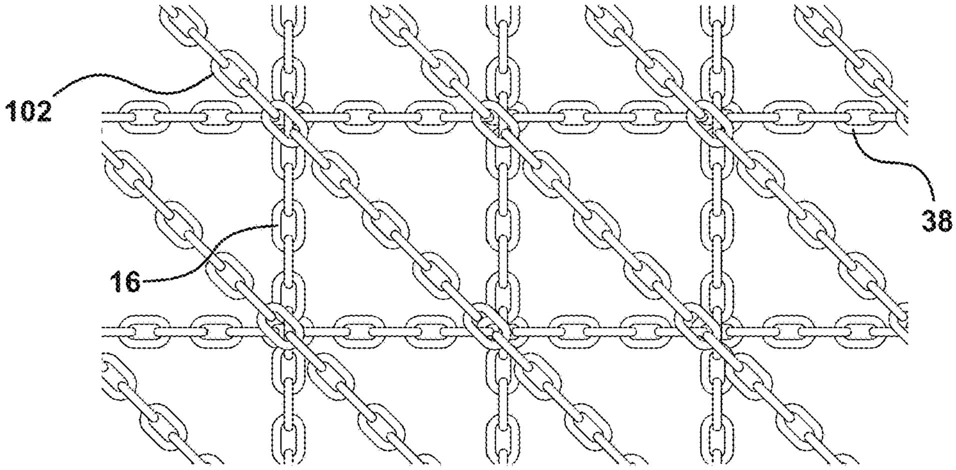
FIG. 22 is a top view of an alternate layout of the lengths of chain.

FIGS. 21 to 24, illustrate alternate embodiments of the layout of the lengths of chain. In FIG. 21, two overlaying lengths of chain 16 and 38 are used is a square lattice pattern. FIG. 22, illustrates additional lengths of chain 102 laid diagonally over the square lattice pattern of lengths of chain 16 and 38.

Figure 23:
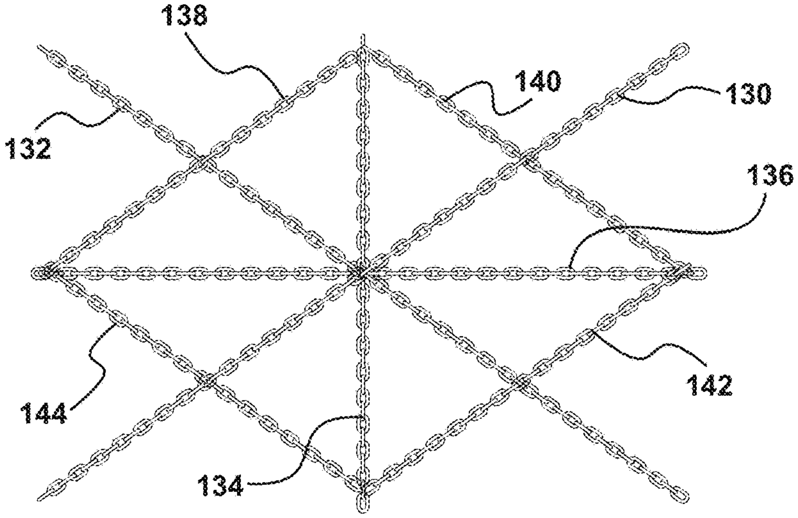
FIG. 23 is a top view of yet another alternate layout of the lengths of chain.

FIG. 23, illustrates a generally square web shape configuration with 10) intersecting lengths of chain 130, 132, 134, 136 and intersecting lengths of chain 138, 140, 142, 144.

Figure 24:
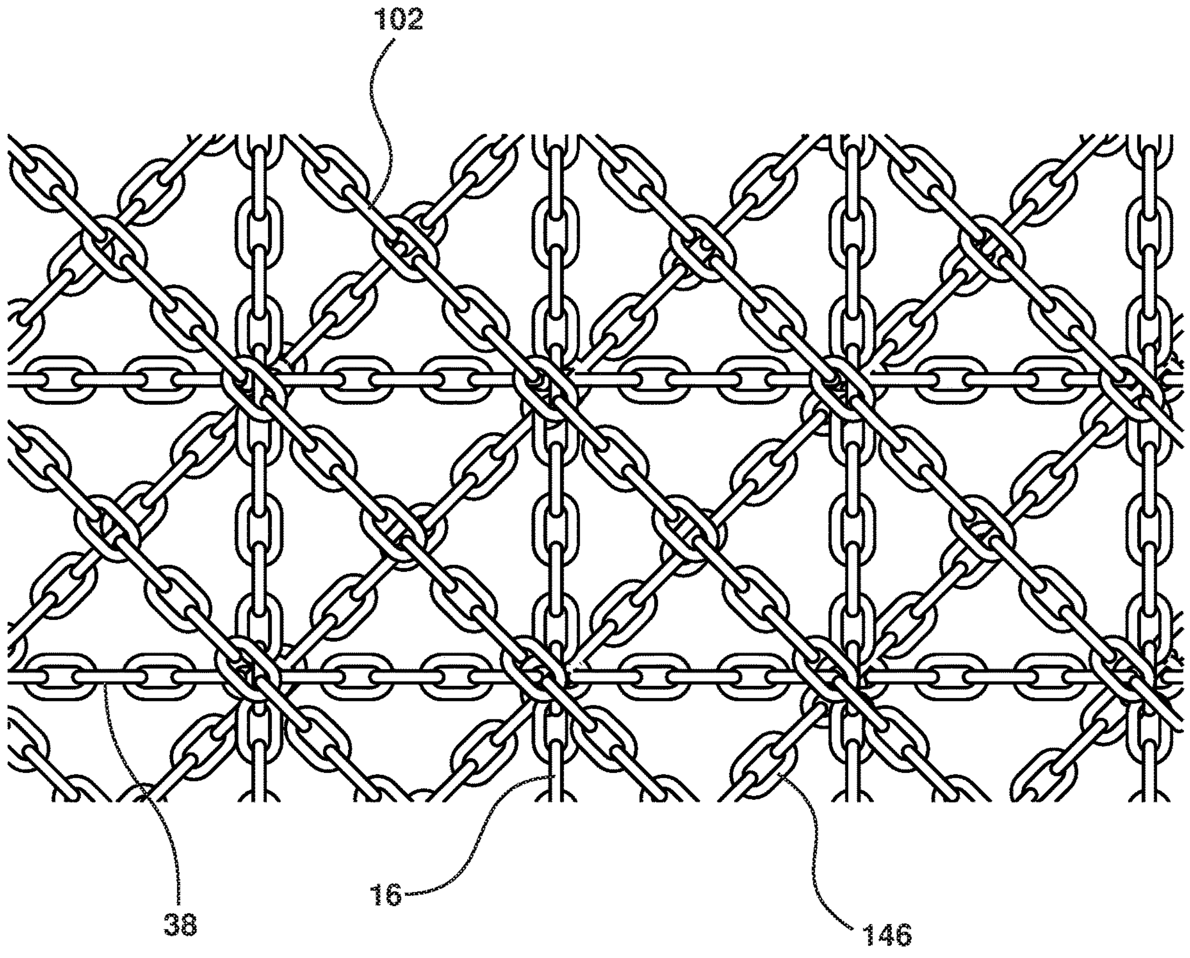
FIG. 24 is a top view of still another alternate layout of the lengths of chain.

FIG. 24, illustrates additional lengths of chain 146 laid diagonally over the lengths of chain 16, 38 and 102 of FIG. 22. The reader will also appreciate that other additional reinforcement, such as but not limited to mesh or wire, could be used without departing from the scope of the invention.

Figure 25:
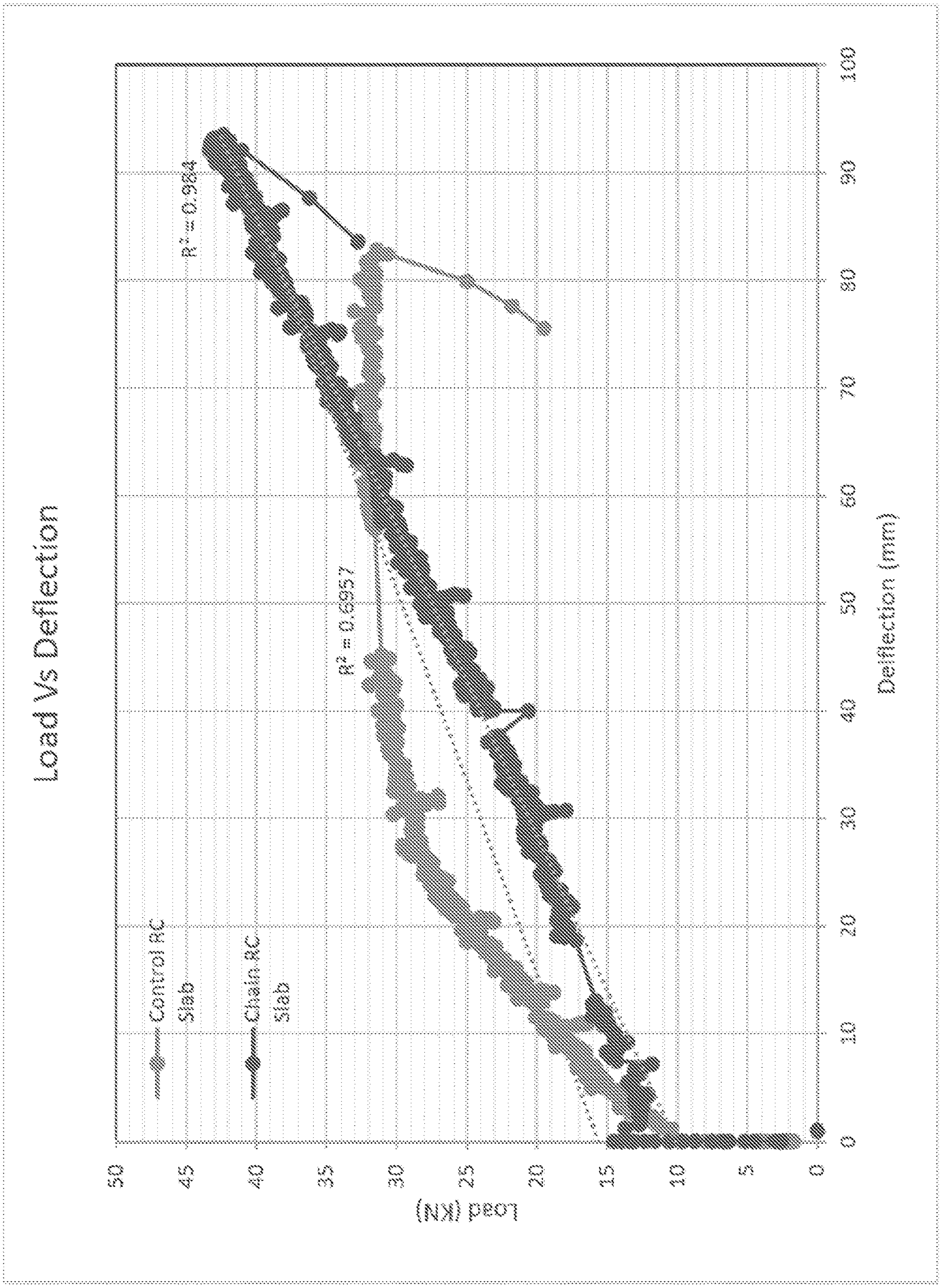
FIG. 25 test results of load vs deflection curve for 100 mm thick slabs.

FIG. 25 illustrates the test result of load vs deflection curve for a 100 mm thick slab containing the reinforcement assembly 10 of the present invention (chain slab) compared to a 100 mm thick slab containing conventional reinforcement (conventional slab). The conventional slab included reinforcement comprising 10 mm diameter bars at 200 mm spacing in longitudinal direction and 6 mm bars in transverse direction at 200 mm spacing. The chain slab was cast with chains of 10 mm diameter spaced 200 mm c/c similar to the control slab. Both slabs were 2.2 m×0.9 m×0.1 m size. During testing, the panels were supported in their longest dimension and loading applied through a calibrated load cell. The ultimate load for chain slab was 43.3 kN as opposed to the control slab ultimate load of 33 kN.

The load versus deflection plot for all the panels is shown in FIG. 25. As can be seen the maximum load sustained by the control slab is 33 kN (W) (equivalent line load is about 16.5 kN/m) and the maximum deflection is 83 mm. The maximum load sustained by the chain slab is 43.3 kN (W) (equivalent line load is about 21.65 kN/m) and the maximum deflection is 92 mm. The reader should note that the load carrying capacity of chain RC slab is well above the control slab. In addition, the chain slab did not collapse completely whereas the control slab broke into two pieces at the point of loading.

From FIG. 25, it can also be inferred that the chain reinforced slab exhibits a linear elastic behaviour until the failure load. This suggests that the chain reinforced slab can be analysed using conventional theoretical approaches, i.e. existing equations for moment capacities can be easily modified. As expected, the normal slab exhibits a linear elastic behaviour until the peak load and then progresses to strain-hardening behaviour and failure. By comparison, this may suggest that the chain reinforced slab is stronger and elastic although the normal reinforced slab could be higher in stiffness in the initial stages.

The skilled addressee will now appreciate the many advantages of the illustrated invention. In one form, the invention is able to provide a method and assembly for reinforcing concrete structures that has improved seismic resistance or impact resistance, and includes moveable or adjustable reinforcement elements that can be moved to accommodate services, such as plumbing, and assists in the optimal positioning of the reinforcement within the body of the concrete panel, without adversely affecting the overall strength of the structure. The present invention is therefore suitable for use is earthquake prone regions and where the concrete structure is required to withstand or resist an impact from armaments or other impact. The reader will appreciate that the term "resist" incorporates the idea of minimising the resultant damage, such that the present invention reduces the probability of a catastrophic failure of the concrete structure occurring.

Various features of the invention have been particularly shown and described in connection with the exemplified embodiments of the invention, however, it must be understood that these particular arrangements merely illustrate, and that the invention is not limited thereto. Accordingly the invention can include various modifications, which fall within the spirit and scope of the invention. For the purpose of the specification the words "comprise", "comprises" or "comprising" means "including but not limited to".

The invention claimed is:

1. A reinforcement assembly for a concrete structure being formed using a formwork or mould, comprising:

a plurality of spaced apart first lengths of chain having opposite tetherable ends, the first lengths of chain each including a plurality of interlocked chain links configured for passage of a flowable concrete mixture therethrough;

a first pretensionable member or members, attachable between at least one of said tetherable ends of the first lengths of chain and a first link member or members;

a plurality of spaced apart second lengths of chain having opposite tetherable ends, the plurality of second lengths of chain at an angle to the first lengths of chain, the second lengths of chain each including a plurality of interlocked chain links configured for passage of a flowable concrete mixture therethrough;

a second pretensionable member or members attachable between at least one of said tetherable ends of the second lengths of chain and a second link member or members; and wherein the first link member or members and/or the second link member or members being attachable to or extendable through the formwork or mould, wherein, in use, the reinforcement assembly being adjustable to tension the first pretensionable member or members and the second pretensionable member or members to thereby hold the first lengths of chain and the second lengths of chain in a tensioned condition prior to a flowable concrete mixture being poured into the formwork or mould, whereby the first pretensionable member or members and the second pretensionable member or members being embedded within the concrete structure and the flowable concrete mixture extending through each of the plurality of interlocked chain links of the first lengths of chain and second lengths of chain, whereby the first lengths of chain and the second lengths of chain are maintained in the pretensioned condition within the cured concrete structure.

2. The reinforcement assembly in accordance with claim 1, further including:
- a plurality of first mounting blocks intermediate of the first pretensionable member or members and the first link member or members;
- a plurality of second mounting blocks intermediate of the second pretensionable member or members and the second link member or members; and
- wherein the first link member or members, and second link member or members are attachable to or extendable through the plurality of first mounting blocks or the plurality of second mounting blocks.

3. The reinforcement assembly in accordance with claim 1, wherein the first pretensionable member or members and/or the second pretensionable member or members is/are a spring or a helical spring or a block of resiliently deformable material.

4. The reinforcement assembly in accordance with claim 1, wherein the first pretensionable member or members and the second pretensionable member or members is/are a turnbuckle or other adjustable device.

5. The reinforcement assembly in accordance with claim 1, wherein the first lengths of chain are parallel to each other and the second lengths of chain are parallel to each other.

6. The reinforcement assembly in accordance with claim 5, wherein the parallel first lengths of chain are at an angle to the parallel second lengths of chain, and are interwoven or overlayed to thereby form a crossed mesh configuration.

7. The reinforcement assembly in accordance with claim 1, wherein the first lengths of chain are spaced apart and positionable along a first generally horizontal plane and the second lengths of chain are spaced apart and positionable along a second generally horizontal plane.

8. The reinforcement assembly in accordance with claim 1, wherein the tetherable ends of each of said first lengths of chain are connectable to a respective elongate primary mounting block by respective first pretensionable members and the opposite ends of each of the second lengths of chain are connectable to a respective elongate secondary mounting block by respective second pretensionable members.

9. The reinforcement assembly in accordance with claim 1, wherein one of the tetherable ends of each of the first lengths of chain is connectable to a respective first fixing point or points and one of the tetherable ends of each of the second lengths of chain is connectable to a respective second fixing point or points.

10. The reinforcement assembly in accordance with claim 1, wherein the link member or members each includes a respective additional or alternate tensionable device that is external to the formwork or accessible from an exterior thereof.

11. The reinforcement assembly in accordance with claim 1, wherein the link member or members are coupled to a respective anchor that, in use, is positionable external of the formwork or mould, and at a distance therefrom.

12. A reinforced concrete structure formed with the reinforcement assembly of claim 1.

13. The reinforcement assembly in accordance with claim 1, wherein each of the first lengths of chain and each of the second lengths of chain are individually tensionable.

14. A method of reinforcing a concrete structure comprising:
- constructing a temporary formwork or mould which delineates a boundary of a desired concrete structure;
- positioning a reinforcement assembly inwardly of the temporary formwork or mould by:
- providing a plurality of lengths of chain with tetherable ends, the plurality of lengths of chain comprise interlocking chain links;
- providing a pretensionable member or members;
- providing a link member or members;
- spacing the plurality of lengths of chain apart from one another in the formwork or mould;
- attaching the pretensionable member or members between at least one of said tetherable ends of one or more of the plurality of lengths of chain and the link member or members;
- attaching or extending the link member or members to or through the formwork or mould;
- adjusting the link member or members and/or the pretensionable member or members to tension the plurality of lengths of chain;
- retaining the plurality of lengths of chain in a tensioned condition;
- pouring a flowable concrete mixture into the formwork or mould;
- extending a quantity of the flowable concrete mixture through the chain links of each of the plurality of lengths of chain while in the tensioned condition;
- embedding the pretensionable member or members within the flowable concrete mixture;
- maintaining the plurality of the lengths of chain in the tensioned condition;
- curing the flowable concrete mixture into a solid concrete mixture to form the desired concrete structure; and
- removing the temporary formwork or mould, or removing the desired concrete structure from within the temporary formwork or mould, wherein the plurality of lengths of chain are maintained in the tensioned condition within the desired concrete structure.

15. The method in accordance with claim 14, further comprising:
- arranging the plurality of first lengths of chain generally parallel to one another and spaced apart from one another;
- arranging a plurality of second lengths of chain generally parallel to one another and spaced apart from one another; and
- positioning the plurality of first lengths of chain perpendicular to the plurality of second lengths of chain.

16. The method in accordance with claim 15, further comprising forming the plurality of lengths of chain and the plurality of second lengths of chain by interlocking a plurality of individual chain links with one another.

17. The method in accordance with claim 15, further comprising individually tensioning each of the plurality of lengths of chain and the plurality of second lengths of chain.

18. The method in accordance with claim 14, further comprising coupling a hoist of a crane to a lifting lug or lifting lugs attached to the reinforcement assembly and lifting the desired concrete structure.

* * * * *